(12) United States Patent
Endo et al.

(10) Patent No.: US 8,404,032 B2
(45) Date of Patent: Mar. 26, 2013

(54) HUMIDITY-CONDITIONING SHEET

(75) Inventors: Takahiro Endo, Iwaki (JP); Masaru Shimoyama, Kitakyushu (JP); Yuko Tsuruta, Kitakyushu (JP); Yutaka Mori, Kitakyushu (JP)

(73) Assignee: Nippon Kasei Chemical Company Limited, Iwaki-shi (JP)

( * ) Notice: Subject to any disclaimer, the term of this patent is extended or adjusted under 35 U.S.C. 154(b) by 595 days.

(21) Appl. No.: 12/517,370

(22) PCT Filed: Dec. 10, 2007

(86) PCT No.: PCT/JP2007/073784
§ 371 (c)(1),
(2), (4) Date: Jun. 3, 2009

(87) PCT Pub. No.: WO2008/075579
PCT Pub. Date: Jun. 26, 2008

(65) Prior Publication Data
US 2010/0005968 A1    Jan. 14, 2010

(30) Foreign Application Priority Data
Dec. 21, 2006    (JP) .................................. 2006-344535

(51) Int. Cl.
*B01D 53/02*    (2006.01)
(52) U.S. Cl. .............................. 96/154; 55/486; 55/524
(58) Field of Classification Search ................ 96/4, 11, 96/12, 154; 95/117, 152
See application file for complete search history.

(56) References Cited

U.S. PATENT DOCUMENTS

| | | | | |
|---|---|---|---|---|
| 5,019,311 | A | * | 5/1991 | Koslow .......................... 264/122 |
| 5,244,707 | A | * | 9/1993 | Shores ............................. 428/76 |
| 5,302,437 | A | * | 4/1994 | Idei et al. .................... 428/32.22 |
| 6,686,000 | B2 | * | 2/2004 | Ichinose ..................... 428/32.32 |

(Continued)

FOREIGN PATENT DOCUMENTS

| | | |
|---|---|---|
| EP | 0 400 460 A1 | 12/1990 |
| EP | 0 693 313 A1 | 1/1996 |

(Continued)

OTHER PUBLICATIONS

Office Action issued Jul. 29, 2011, in Chinese Patent Application No. 200780042776.8 with English translation.

(Continued)

*Primary Examiner* — Duane Smith
*Assistant Examiner* — Pankti Patel
(74) *Attorney, Agent, or Firm* — Oblon, Spivak, McClelland, Maier & Neustadt, L.L.P.

(57) ABSTRACT

A humidity-conditioning sheet 10 excellent in reversibility and responsiveness of a moisture adsorbing/desorbing ability of rapidly adsorbing moisture at high ambient humidity and conversely rapidly desorbing adsorbed moisture at low ambient humidity includes a sheet-shaped humidity-conditioning layer 7 formed by bonding together, with a thermoplastic resin powder 4, humidity-conditioning particles 3 which reversibly adsorb and desorb water vapor. The void ratio of the humidity-conditioning layer 7 is 5% or more. Since a ratio of voids 8 formed between the humidity-conditioning particles 3 is high, the voids 8 between the humidity-conditioning particles 3 can be used as water retention spaces for moisture adsorption and desorption, thereby achieving the high reversible moisture adsorbing/desorbing ability and excellent moisture adsorption/desorption responsiveness with the aid of not only the moisture adsorbing/desorbing ability inherent in the humidity-conditioning particles but also the moisture adsorbing/desorbing ability of the voids between the humidity-conditioning particles.

10 Claims, 3 Drawing Sheets

U.S. PATENT DOCUMENTS

| | | | |
|---|---|---|---|
| 2003/0162010 A1* | 8/2003 | Forte | 428/315.5 |
| 2004/0090513 A1 | 5/2004 | Ohya et al. | |
| 2005/0030363 A1* | 2/2005 | De Vries et al. | 347/106 |
| 2010/0005968 A1* | 1/2010 | Endo et al. | 96/6 |

FOREIGN PATENT DOCUMENTS

| | | |
|---|---|---|
| JP | 10-17699 | 1/1998 |
| JP | 11 29991 | 2/1999 |
| JP | 2000 43179 | 2/2000 |
| JP | 2001 334596 | 12/2001 |
| JP | 2003-33623 | 2/2003 |
| JP | 2004-209960 | 7/2004 |
| JP | 2006-321207 | 11/2006 |

OTHER PUBLICATIONS

Office Action issued Apr. 25, 2012 in Chinese Patent Application No. 200780042776.8 (with English translation).

Supplementary European Search Report issued Sep. 7, 2012 in European Patent Application No. 20070850352, filed Dec. 10, 2007.

Office Action issued Jul. 31, 2012, in Japanese Patent Application No. 2007-318498, filed Dec. 10, 2007.

Office Action issued Nov. 2, 2012, in Chinese Patent Application No. 200780042776.8, filed Dec. 10, 2007 (w/English-language translation).

* cited by examiner

HUMIDITY-CONDITIONING SHEET

TECHNICAL FIELD

The present invention relates to a humidity-conditioning sheet effective for applications in which for example, in inner walls and ceilings of buildings and storages, inner walls of refrigerators (freezers) and refrigerator cars (freezer cars), and inner walls of casings for mounting electric/electronic components such as electric lights and precision electron apparatuses, internal humidity is controlled by reversibly rapidly adsorbing and desorbing water vapor to prevent dew condensation.

BACKGROUND ART

In recent years, air tightness of rooms in buildings have increased due to westernization, but the problems of dew condensation on wall surfaces and the like have occurred due to the loss of air permeability. In particular, the occurrence of water vapor due to use of space heaters causes a large problem of dew condensation in the winter. Such a phenomenon becomes a problem not only in rooms of general houses but also in buildings and storages used in operation. Specifically, there occur the problems with appearance due to dew condensation, floor stains due to dropping of dew condensation water from ceilings, stains on articles stored in storages, deterioration with water, and the like.

In refrigerators (or freezers) and refrigerator cars (or freezer cars), the humidity in refrigerators (freezers) is changed by circulation of cooling cold air and inflow of warm air due to door opening and closure and the like, thereby causing dew condensation. In vegetable compartments of refrigerators, water remains in the vegetable compartments to cause deterioration of freshness of vegetables. In refrigerators, dew condensation water produced on the inner walls of top plates drops on products (articles) during transport, thereby causing deterioration of appearance and quality.

The problem of dew condensation due to a change in humidity also occurs in casings for mounting, for example, electric lights or precision electronic apparatuses therein, thereby causing the problems of clouding of lenses, short circuiting of electric circuits, and the like due to dew condensation.

When dew condensation in such closed spaces is prevented, it is not sufficient to simply adsorb moisture with a drying material and the like. For example, in vegetable compartments of refrigerators, it is necessary to prevent dew condensation while maintaining appropriate humidity conditions suitable for storing vegetables. Similarly, in room spaces, it is important to maintain appropriate humidity.

Hygroscopic materials which simply adsorb moisture no longer can be used after moisture adsorbing performance is saturated. Materials having the moisture adsorbing and desorbing ability of adsorbing moisture at high ambient humidity and desorbing the adsorbed moisture at low ambient humidity can be continuously used over a long period of time because adsorption and desorption of moisture are repeated.

Humidity-conditioning materials which adsorb moisture at high ambient humidity to prevent dew condensation and which desorb the adsorbed moisture at low ambient humidity to increase humidity and recover hygroscopicity by moisture desorption are practically used as humidity-conditioning sheets mainly formed in sheets.

Conventional humidity-conditioning sheets including hygroscopic materials such as water-absorbing polymers, e.g., polysodium acrylate, have excellent hygroscopicity but have low moisture desorbing ability, and thus the sheets have the problem that they little desorb moisture under usual operation conditions or if they desorb moisture, a long time is required until the initial hygroscopicity is returned because of the low moisture desorption rate.

When humidity-conditioning sheets with low moisture desorption are continuously used, the water adsorbed in the sheets is saturated, and the sheets no longer function as humidity-conditioning sheets, thereby failing to prevent the problem due to dew condensation.

Humidity-conditioning sheets having insufficient moisture desorbing function also have the hygienic problem of occurrence of molds or bacterial growth due to water retained over time.

Therefore, humidity-conditioning sheets are required to have the function to reversibly rapidly adsorb and desorb water vapor.

Examples of conventional humidity-conditioning sheets include one proposed in Japanese Unexamined Patent Application Publication No. 2000-43179 in which a base sheet is coated with a mixture of template-type meso-porous silica having a controlled average pore size and a binder to form a humidity-conditioning layer. However, the humidity-conditioning sheet has the humidity-conditioning layer formed by coating and thus has limitation on thickening, and thus the excellent humidity-conditioning function inherent in the meso-porous silica used as a humidity-conditioning material is not effectively utilized.

Japanese Unexamined Patent Application Publication No. 2001-334596 proposes a humidity-conditioning sheet having a humidity-conditioning layer formed by bonding silica gel particles between two sheets with hot melt powder. The humidity-conditioning sheet also does not have sufficient humidity-conditioning properties.

Patent Document 1: Japanese Unexamined Patent Application Publication No. 2000-43179

Patent Document 2: Japanese Unexamined Patent Application Publication No. 2001-334596

SUMMARY OF THE INVENTION

An object of the present invention is to provide a humidity-conditioning sheet excellent in reversibility and responsiveness of the moisture adsorbing/desorbing ability of rapidly adsorbing moisture at high ambient humidity and conversely rapidly desorbing the adsorbed moisture at low ambient humidity.

As a result of intensive research for resolving the above-mentioned problems, the inventor obtained the following findings:

When humidity-conditioning particles which reversibly adsorb and desorb water vapor are formed into a sheet by bonding with a thermoplastic resin powder to form a humidity-conditioning layer, the voids formed between the humidity-conditioning particles become an important factor which influences the moisture adsorbing and desorbing ability and the responsiveness thereof. Also, even when humidity excessively increases to cause a condition in which dew condensation occurs, the voids also become important water retention spaces, and thus it is important that the ratio of the voids between the humidity-conditioning particles is high to some extent.

When the thermoplastic resin powder used as an adhesive (binder) exposed in the voids has low hydrophilicity, the voids cannot be effectively utilized for controlling humidity. Therefore, the thermoplastic resin powder is preferably a hydrophilic rein powder having a high moisuture adsorption property.

In order to increase the surface area of the humidity-conditioning particles to effectively exhibit the humidity-conditioning function inherent in the humidity-conditioning particles, it is necessary that the thermoplastic resin has low MFR and low mobility during heat sealing so that the surfaces of the humidity-conditioning particles are not excessively coated with the thermoplastic resin powder used as the adhesive and the fine pores of the humidity-conditioning particles are not closed by the powder.

The present invention has been achieved on the basis of the above-described findings.

A humidity-conditioning sheet of the present invention includes a sheet-shaped humidity-conditioning layer formed by bonding together, with a thermoplastic resin powder, humidity-conditioning particles which reversibly adsorb and desorb water vapor, wherein the void ratio of the humidity-conditioning layer is 5% or more.

The present invention provides the humidity-conditioning sheet excellent in reversibility and responsiveness of the moisture adsorbing and desorbing ability.

The humidity-conditioning sheet of the present invention includes the sheet-shaped humidity-conditioning layer formed by bonding together the humidity-conditioning particles with the thermoplastic resin powder, and the humidity-conditioning layer has a high ratio of voids formed between the humidity-conditioning particles. Therefore, water vapor easily diffuses in the humidity-conditioning sheet, and thus the initial water adsorbing and desorbing ability of the humidity-conditioning particles is sufficiently exhibited, thereby achieving the high reversible moisture adsorbing and desorbing ability and excellent water adsorption and desorption responsiveness.

In the present invention, the weight ratio of the thermoplastic resin powder to the humidity-conditioning particles which constitute the humidity-conditioning layer is preferably 1/4 to 4/1.

The ratio of the average particle diameter of the thermoplastic resin powder to that of the humidity-conditioning particles is preferably 1/8 to 15/1.

The average particle diameter of the humidity-conditioning particles is preferably 5 to 1,000 μm.

As the humidity-conditioning particles, particles of at least one silicon compound, particularly silica, are preferred from the viewpoint of excellent humidity-conditioning function.

The humidity-conditioning layer of the present invention preferably includes an antibacterial agent and/or an antifungal agent from the viewpoint of preventing the occurrence of molds and bacterial growth due to water during moisture adsorption.

The thermoplastic resin of the thermoplastic resin powder according to the present invention preferably has a moisture adsorption coefficient of 0.2% or more and a MFR of 55 g/10 min or less. In this case, the hydrophilic thermoplastic resin powder with a high moisture adsorption coefficient is exposed in the voids formed between the humidity-conditioning particles, or the surfaces and pores of the humidity-conditioning particles are not excessively coated or closed with the thermoplastic resin powder because the thermoplastic resin powder has low MFR and the thermoplastic resin has low mobility in heat sealing, thereby securing large pore surface area of the humidity-conditioning particles which are exposed to the voids. Therefore, the rate of effective utilization of the pores of the humidity-conditioning particles for moisture adsorption and desorption can be increased, and the voids between the humidity-conditioning particles can be more effectively used as water retention spaces for moisture adsorption and desorption, thereby achieving the high reversible water adsorbing and desorbing ability and excellent water adsorption and desorption responsiveness.

In the present invention, the sheet-shaped humidity-conditioning layer formed by bonding together the humidity-conditioning particles with the thermoplastic resin powder can be sufficiently used alone as a humidity-conditioning sheet, but a base material sheet composed of an air-permeable material may be laminated on at least one of the surfaces of the humidity-conditioning layer and integrated therewith. In addition, a base material sheet may be laminated on at least one of the surfaces of the humidity-conditioning layer, an adhesive layer may be provided on the side of the base material sheet opposite to the humidity-conditioning layer, and a separating sheet may be further laminated on the adhesive layer.

DETAILED DESCRIPTION OF THE INVENTION

Figure 1:
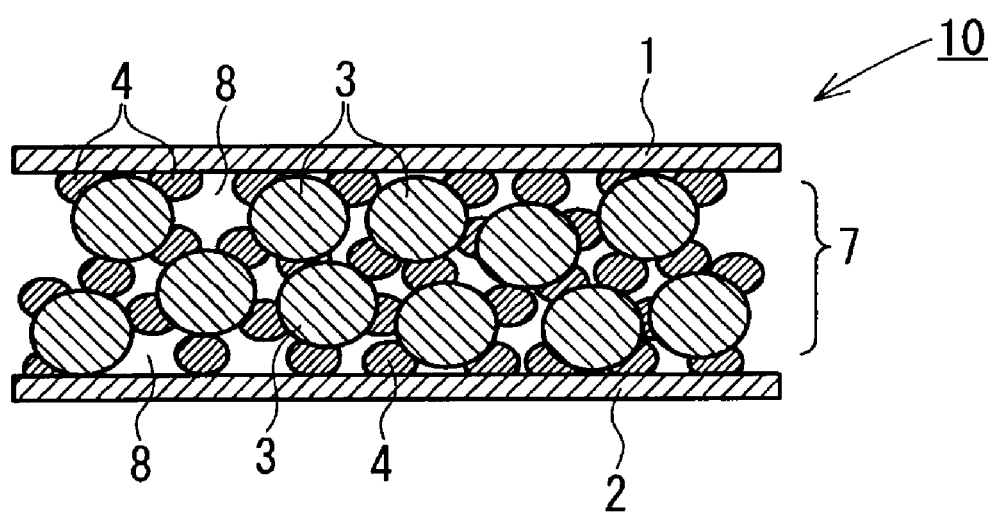
FIG. 1 is a schematic sectional view showing a humidity-conditioning sheet according to an embodiment of the present invention.

A humidity-conditioning sheet according to an embodiment of the present invention will be described in detail below with reference to the drawings.

In the present invention, the moisture adsorption coefficient and MFR of a thermoplastic resin and the void ratio of a humidity-conditioning layer were measured as described below.

<Moisture Adsorption Coefficient of Thermoplastic Resin>

A thermoplastic resin powder is uniformly scattered on a polyester-made separation film or an aluminum foil, and then a polyester-made separation film or an aluminum foil is laminated thereon to hold the thermoplastic resin powder between the two films or aluminum foils. Then, the resultant laminate is treated by a hot press at 0.5 MPa for minutes at a temperature 10° C. higher than the melting point of the thermoplastic resin powder, and then the separation films or aluminum foils are removed to form a film (thickness of about 1 mm) for measuring the moisture adsorption coefficient. The resultant film is immersed in water at 25° C. for 3 hours and then pulled up, and then the film is sandwiched between sheets of paper with high moisture adsorption to remove water droplets from the surfaces. Then, the weight is measured, and the moisture adsorption coefficient (=increase in weight/weight before moisture adsorption×100) is calculated from an increase in weight.

<MFR of Thermoplastic Resin>

MFR is measured at 190° C. with a load of 2.16 kg according to JISK6760.

<Void Ratio of Humidity-conditioning Layer>

The void ratio of a humidity-conditioning layer represents a ratio (percentage) of voids (not including the pore volume of humidity-conditioning particles) in a volume formed between sheets having smooth surfaces which are laminated on both surfaces of the humidity-conditioning layer. The void ratio is determined by calculation from the volume of a constituent material in the humidity-conditioning layer, which is determined from the specific gravity and the weight of the material used for constituting the humidity-conditioning layer, and the apparent volume of the humidity-conditioning layer (the volume formed between the sheets).

Specifically, for a humidity-conditioning layer of 12 cm×12 cm (area), the void ratio is calculated by the following method:

Volume of humidity-conditioning layer [cm$^3$] 12×12× (thickness of humidity-conditioning layer)

Volume of humidity-conditioning particles [cm$^3$] (weight of humidity-conditioning layer)×(weight ratio of humidity-conditioning particles in humidity-conditioning layer constituent powder)/ (absolute specific gravity of humidity-conditioning particles)

Pore volume of humidity-conditioning particles [cm$^3$] (weight of humidity-conditioning layer)×(weight ratio of humidity-conditioning particles in humidity-conditioning layer constituent powder)×(pore volume of humidity-conditioning particles [cm$^3$/g])

Volume of thermoplastic resin powder [cm$^3$] (weight of humidity-conditioning layer)×(weight ratio of thermoplastic resin powder in humidity-conditioning layer constituent powder)/(density of thermoplastic resin powder)

Void volume [cm$^3$] (volume of humidity-conditioning layer [cm$^3$]–volume of humidity-conditioning particles [cm$^3$]–pore volume of humidity-conditioning particles [cm$^3$]–volume of thermoplastic resin powder [cm$^3$])

Void ratio of humidity-conditioning layer [%] (void volume [cm$^3$])/(volume of humidity-conditioning layer [cm$^3$])×100

Figure 2:
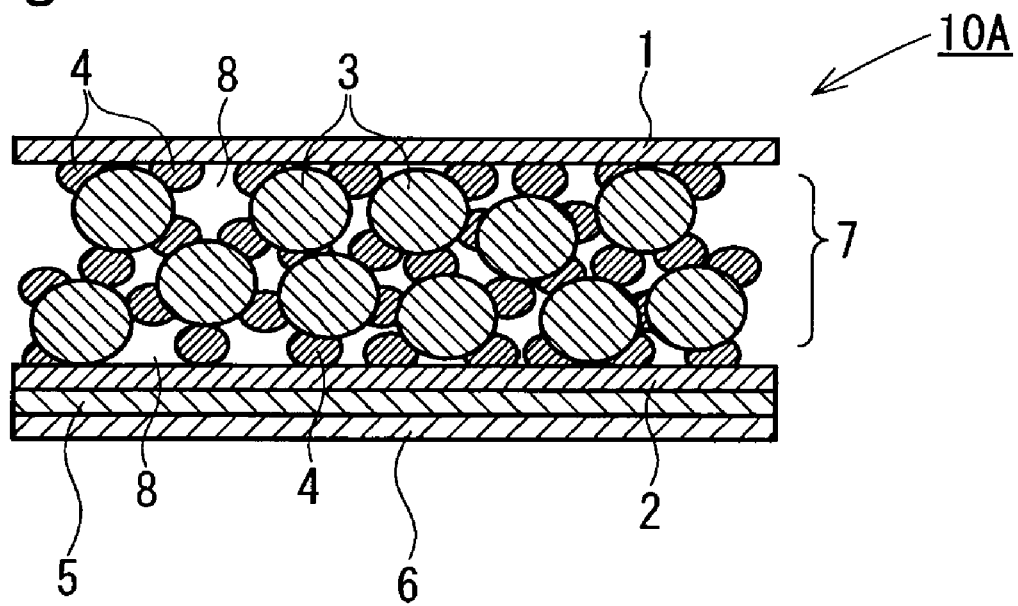
FIG. 2 is a schematic sectional view showing a humidity-conditioning sheet according to another embodiment of the present invention.

FIGS. 1 and 2 are sectional views each schematically showing a humidity-conditioning sheet according to an embodiment of the present invention.

A humidity-conditioning sheet 10 shown in FIG. 1 is a laminated humidity-conditioning sheet including a sheet-shaped humidity-conditioning layer 7 which is formed between two base sheets 1 and 2 by bonding together humidity-conditioning particles 3 with a thermoplastic resin powder 4. A humidity-conditioning sheet 10A shown in FIG. 2 is a laminated humidity-conditioning sheet including an adhesive layer 5 further formed on the surface of the base sheet 2 opposite to the humidity-conditioning layer 7 in the humidity-conditioning sheet 10 shown in FIG. 1 and a separation sheet 6 laminated on the adhesive layer 5.

In FIGS. 1 and 2, reference numeral 8 denotes voids formed between the humidity-conditioning particles 3.

The humidity-conditioning particles 3 used in the humidity-conditioning sheets of the present invention are not particularly limited, but preferably contain at least one type of silicon compound. Examples of the silicon compound include silica, zeolite, porous glass, apatite, diatomaceous earth, kaolinite, sepiolite, allophane, imogolite, activated clay, silica-alumina compound oxide, silica-titania compound oxide, compound metal oxides such as silica-zirconia, silica-magnesium oxide, silica-lanthanum oxide, silica-barium oxide, silica-strontium oxide, and the like. In particular, silica, sepiolite, zeolite, and the like are preferred as the silicon compound.

Examples of a material of the humidity-conditioning particles other than the silicon compound include activated carbon, alumina, titania, zirconia, and the like. In particular, alumina, titania, zirconia, and the like are preferred.

These materials of the humidity-conditioning particles may be used alone or in any combination of two or more at any ratio.

In the humidity-conditioning sheet of the present invention, at least the silicon compound is preferably used as the humidity-conditioning particles, and silica (appropriately referred to as "silica according to the present invention") having specified physical properties, which will be described below, is particularly preferably used.

It is preferred that the average particle diameter of the humidity-conditioning particles used in the humidity-conditioning sheet of the present invention is generally 5 µm or more, particularly 10 µm or more, and generally 1,000 µm or less, particularly 900 µm or less. When the average particle diameter of the humidity-conditioning particles in the humidity-conditioning sheet is excessively small, the filling rate of the humidity-conditioning particles in the humidity-conditioning layer is increased, and thus the ratio of voids between the particles may be decreased to decrease the water capacity. When the average particle diameter of the humidity-conditioning particles is excessively large, the filling rate of the humidity-conditioning particles in the humidity-conditioning layer is decreased to increase the void ratio between the particles. However, water retention becomes difficult because the surfaces of the humidity-conditioning layer have large void openings, and thus the water capacity may be decreased. In addition, since there are few contact points between the thermoplastic resin and the humidity-conditioning particles, the humidity-conditioning particles easily separate from the humidity-conditioning layer, thereby easily decreasing abrasion resistance and weather resistance.

The average particle diameter of the humidity-conditioning particles can be measured by a method using a laser diffraction/scattering type particle size distribution measurement apparatus described below in <Characteristics of silica>.

The modal pore diameter of the humidity-conditioning particles used in the humidity-conditioning sheet of the present invention is generally 2 nm or more, preferably 3 nm or more, and generally 20 nm or less, preferably 18 nm or less. In the present invention, when the modal pore diameter of the humidity-conditioning particles is appropriately controlled in such a wide range, the moisture adsorption range of the resultant humidity-conditioning sheet can be changed.

The modal pore diameter of the humidity-conditioning particles can be measured by, for example, a method using a pore distribution curve which is obtained by a BJH calculation method from an isothermal adsorption-desorption curve measured by a nitrogen gas adsorption-desorption method as described below in <Characteristics of silica>.

[Characteristics of Silica]

The characteristics of silica (referred to as "silica according to the present invention" hereinafter) suitable as the humidity-conditioning particles used in the humidity-conditioning sheet of the present invention are described below.

(a) Amorphousness:

The silica according to the present invention preferably has an amorphous three-dimensional structure, i.e., a crystal structure is not observed. This represents that in X-ray diffraction analysis of the silica according to the present invention, substantially no crystal peak is observed. In the specification, "amorphous silica" represents that no crystal structure peak (crystalline peak) is observed at a position exceeding 0.6 nanometer (nm units d-spacing) in an X-ray diffraction pattern. Examples of such silica include micellar template silica in which pores are formed using an organic template. The amorphous silica is excellent in productivity as compared with crystalline silica.

(b) Specific Surface Area:

The specific surface area of the silica according to the present invention generally 200 m²/g or more, preferably 250 m²/g or more, and generally 1000 m²/g or less, preferably 900 m²/g or less. Since the silica according to the present invention has such a large specific surface area, the area of interaction between the silica and a substance (moisture) adsorbed in the pores of the silica in the humidity-conditioning sheet of the present invention can be increased. In addition, the interaction with the substance can be significantly controlled by changing the surface conditions of the pores of the silica. The specific surface area of the silica can be measured by a BET method using nitrogen gas adsorption/desorption.

(c) Pore Volume:

The pore volume per unit weight of the silica according to the present invention (In the specification, an amount shown by "pore volume/weight" is simply referred to as "pore volume" unless otherwise specified, but the pore volume shown as an absolute volume is referred to as "total pore volume". Both volumes are differentiated.) is generally 0.3 ml/g or more, preferably 0.35 ml/g or more. Since the silica according to the present invention has such a large pore volume, the humidity-conditioning layer of the humidity-conditioning sheet of the present invention can exhibit the high ability of adsorbing and desorbing water vapor. The upper limit of the pore volume is not particularly limited but generally 3.0 ml/g or less, preferably 2.5 ml/g or less. The pore volume of the silica can be determined from the amount of nitrogen gas adsorbed at a relative pressure of 0.98 in an adsorption isotherm.

(d) Modal Pore Diameter:

The silica according to the present invention has a modal pore diameter ($D_{max}$) in the range of generally 2 nm or more, preferably 2.3 nm or more, and generally 20 nm or less, preferably 18 nm or less, which is determined from a pore size distribution curve calculated from an isothermal adsorption-desorption curve measured by a nitrogen gas adsorption-desorption method by the BJH method described in E. P. Barrett, L. G. Joyner, P. H. Haklenda, J. Amer. Chem. Soc., vol. 73, 373 (1951), i.e., determined from a plot of differential amounts of adsorption of nitrogen gas ($\Delta V/\Delta(\log d)$) wherein V is the volume of adsorption of nitrogen gas) vs. pore diameters d (nm). In the present invention, when the modal pore diameter ($D_{max}$) of the silica is appropriately controlled in such a wide range, the water vapor adsorption range of the humidity-conditioning layer of the humidity-conditioning sheet of the present invention can be changed. The silica according to the present invention need not show a maximum sharp peak which indicates the modal pore diameter ($D_{max}$) in a pore size distribution curve. In order to achieve a sufficient amount of moisture adsorption, as described above, it is important that the pore volume of the silica is in the range described in (c).

As described below, the method for producing the silica according to the present invention is not particularly limited, and the silica can be produced by any known method. The pore diameter can be arbitrarily controlled according to the production method used. The water vapor adsorbing and desorbing ability exhibited by the humidity-conditioning sheet of the present invention is exhibited according to the pore diameter in some cases, and thus the pore diameter of the silica used is preferably appropriately determined according to application. The humidity controlled by the moisture adsorbing and desorbing ability of the silica depends on the pore diameter thereof.

(e) Average Particle Diameter:

It is preferred that the average particle diameter of the silica is generally 5 μm or more, particularly 10 μm or more, and generally 1,000 μm or less, particularly 900 μm or less. When the average particle diameter of the silica is excessively small, the filling rate of the particles in the humidity-conditioning layer is increased, and thus the void ratio between the particles may be decreased to decrease the water capacity. When the average particle diameter of the silica is excessively large, the ratio of voids between the particles is increased. However, water cannot be retained, and thus the water capacity is decreased. Therefore, an excessively large or small average particle diameter is undesired for the silica, and it is important that the average particle diameter of the silica is in the above-described range. The average particle diameter of the silica can be determined from the results of measurement of a particle size distribution using a laser diffraction/scattering type particle size distribution measurement apparatus (for example, Laser Micronsizer LMS-24 manufactured by Seishin Enterprise Co., Ltd.) or the like.

(f) Silanol Amount:

The silanol amount of the silica according to the present invention is generally 2 groups/nm² or more, preferably 2.5 groups/nm² or more, and more preferably 3 groups/nm² or more, and generally 10 groups/nm² or less, preferably 8.5 groups/nm² or less, and more preferably 7 groups/nm² or less. When the silanol amount is excessively small, humidity sensitivity deteriorates due to hydrophobicity, and moisture adsorption decreases. When the silanol amount is excessively large, adhesiveness with the thermoplastic resin powder degrades, thereby decreasing durability and causing a defect in the humidity-conditioning layer. Therefore, the silanol amount is preferably in the above-described range. The silanol amount can be calculated by, for example, a method based on a weight change measured by thermogravimetry as described below.

<Method for Calculating Silanol Amount>

In order to remove the moisture adsorbed on silica, silica is heated at 160° C. and maintained for 2 hours, and heated to 1000° C. and maintained further for 1 hour to measure a weight change of silica in this process. The moisture content derived from silanol corresponds to a value obtained by subtracting a $CO_2$ weight derived from alcohol in hydrothermal treatment from the weight change during heating (i.e., weight deceased by heating from 160° C. to 1,000° C.). Specifically, the moisture content can be calculated by the following equation (1).

Moisture content derived from silanol (g)=weight deceased (g) by heating from 160° C. to 1000° C.−$CO_2$ weight (g) derived from alcohol    (1)

Assuming that one molecule of $H_2O$ is formed from two molecules of silanol, the silanol number and silanol amount of silica can be calculated on the basis of the following equations (2) and (3), respectively.

Silanol number (groups)=[moisture content (g) derived from silanol×Avogadro constant 6.02×$10^{23}$ molecule/mol×2]/$H_2O$ molecular weight (g/mol)    (2)

Silanol amount (groups/nm²)=silanol number groups/ surface area (nm²)    (3)

(g) Other Characteristics:

Other characteristics of the silica according to the present invention are not particularly limited as long as the above-mentioned characteristics (a) to (f) are satisfied, but the characteristics described below are preferably further satisfied.

Particle Shape and Particle Size Distribution:

With respect to the shape of silica particles, in Japanese Unexamined Patent Application Publication No. 2003-220657, it is described that the filling rate of inorganic porous material can be increased using spherical particles, thereby improving the moisture-adsorbing/desorbing ability. However, the particle shape of the silica according to the present invention may be either a spherical shape or crashed shape. The crushed shape is more preferred because of a larger number of voids between particles. When there are many fine powder aggregates, the efficiency of utilization of pores is decreased. When further aggregation occurs, the homogeneity of the humidity-conditioning layer may be decreased, and adhesiveness with the thermoplastic resin may be decreased, thereby causing falling of particles. Therefore, a narrower particle size distribution is more preferred.

The particle shape of the silica can be recognized by a method such as SEM (scanning electron microscope) or the like.

The particle size distribution of the silica can be measured by a method using a laser diffraction/scattering type particle size distribution measurement apparatus (Laser Micronsizer LMS-24 manufactured by Seishin Enterprise Co., Ltd.) or the like.

Characteristics as to Hydrothermal Test Resistance:

The silica according to the present invention is preferably little changed in pore characteristics even when subjected to heat treatment in water (hydrothermal test). Changes in the pore characteristics of the silica after the hydrothermal resistance test are observed as changes in the physical properties as to porosity, such as specific surface area, pore volume, pore size distribution, and the like. For example, when the silica according to the present invention is subjected to a hydrothermal resistance test at 200° C. for 6 hours, the specific surface area after the test is preferably 20% or more (that is, remaining ratio of specific surface area is 20% or more) of the specific surface area before the test. The silica according to the present invention having such properties is preferred because the properties of porosity are hardly lost even under severe conditions of use for a long period of time. This remaining ratio of specific surface area is further preferably 35% or more, still further preferably 50% or more.

The hydrothermal resistance test in the present invention means a treatment in which silica is brought into contact with water of a specified temperature (200° C.) for a fixed period of time (6 hours) in a closed system. The whole interior of the closed system may be filled with water, or the closed system may partially have a vapor phase portion under pressure therein, and steam may be present in the vapor phase portion as long as the whole silica according to the present invention is present in water. In this case, the pressure of the vapor phase portion may be, for example, at least 60,000 hPa, preferably at least 63,000 hPa. An error of the specified temperature is preferably settled within ±5° C., especially ±3° C., further especially ±1° C.

Characteristics as to Solid-state Si—NMR Measurement:

With respect to the structure of the silica according to the present invention, the results described below are preferably obtained in analysis by solid-state Si—NMR (nuclear magnetic resonance) measurement.

Silica is amorphous silica hydrate and represented by the rational formula $SiO_2 \cdot nH_2O$, but from a structural viewpoint, silica has a structure in which O is bonded at each of the apexes of a tetrahedron of Si, and Si is further bonded to O to form a net-like structure. In the repeat unit of Si—O—Si—O—, O may be partially substituted by another member (for example, —H, —$CH_3$, or the like). When one Si atom is considered, there are $Si(Q^4)$ having four —OSi bonds as shown by formula (A) below, $Si(Q^3)$ having three —OSi bonds as shown by formula (B) below, and the like (in the formulae (A) and (B), the tetrahedral structure is neglected, and the net structure of Si—O is two-dimensionally shown). In solid-state Si—NMR measurement, peaks based on the Si atoms are referred to as $Q^4$ peak, $Q^3$ peak, . . . in turn.

[Chemical Formula 1]

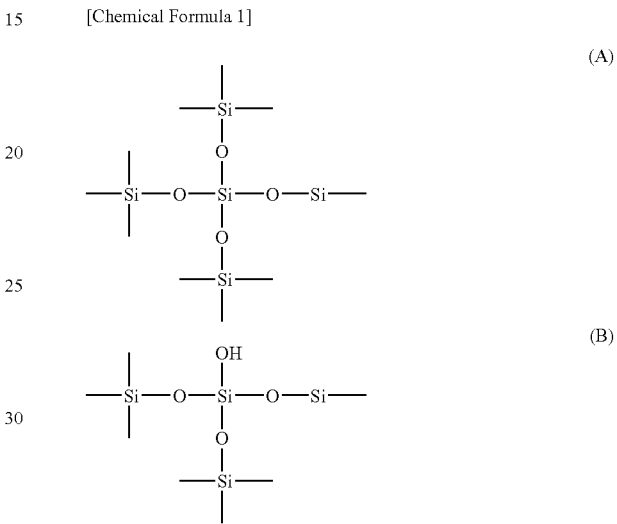

In the solid-state Si—NMR measurement of the silica according to the present invention, a $Q^4/Q^3$ value which indicates a molar ratio between $Si(Q^3)$ having three —OSi bonds and $Si(Q^4)$ having four —OSi bonds is generally 1.2 or more, preferably 1.3 or more, more preferably 1.4 or more, and most preferably 1.5 or more. The upper limit of the $Q^4/Q^3$ value is not particularly limited, but is generally 10 or less.

It is generally known that the thermal stability of silica increases as the $Q^4/Q^3$ value increases, and thus the silica according to the present invention is found to be very excellent in thermal stability. That is, the structure of the silica according to the present invention may be little broken by heat, and thus the humidity-conditioning sheet of the present invention can be stably used over a long period of time. On the other hand, crystalline micellar template silica may have a $Q^4/Q^3$ value of less than 1.2 and thus have low thermal stability, particularly hydrothermal stability.

In addition, the silica according to the present invention preferably has a small distortion in the angle of a siloxane bond which forms a skeleton. A structural distortion of silica can be expressed by a value of chemical shift of $Q^4$ peak in solid-state Si—NMR measurement.

From the viewpoint of a relationship between the structural distortion of silica and the chemical shift of $Q^4$ peak, the silica according to the present invention preferably has a $Q^4$ peak chemical shift δ (ppm) which satisfies the following equation (4):

$$-0.0705 \times (D_{max}) - 110.36 > \delta \qquad (4)$$

The value of δ is preferably smaller than the value $(-0.0705 \times (D_{max}) - 110.36)$ on the left side of the equation (4) and present on the more minus side than the value.

In the specification, "ppm" represents a ratio by weight.

In the conventional silica, the $Q^4$ peak chemical shift δ is generally larger (on the more plus side) than the value calculated on the basis of the left side of the equation (4). Therefore, the silica according to the present invention has a smaller value of $Q^4$ peak chemical shift as compared with conventional silica. This means that the $Q^4$ peak chemical shift of the silica according to the present invention is present at a higher magnetic field, and thus means that the silica according to the present invention has more uniform bond angles represented by two —OSi bonds to Si and smaller structural distortion.

In the silica according to the present invention, the $Q^4$ peak chemical shift δ is preferably at least 0.05% smaller, more preferably at least 0.1% smaller, and most preferably at least 0.15% smaller, than the value calculated on the basis of the left side ($-0.0705 \times (D_{max}) - 110.36$) of the equation (4). The minimum value of the $Q^4$ peak of silica gel is −113 ppm.

The silica according to the present invention has excellent heat resistance and water resistance, and the like, and is not easy to be changed in physical properties. Therefore, the silica according to the present invention maintains the humidity-conditioning function over a long period of time even under high temperature and high humidity. The relationship between this point and the above-described structural distortion is not necessarily known, but the following is estimated. That is, silica is composed of an aggregate of spherical particles of different sizes, but a high degree of homogeneity is maintained in the micro-structure over the spherical particles under a condition in which there is small structural distortion. As a result, excellent heat resistance and water resistance, and the like are exhibited. Since the $Q^3$ peak, $Q^2$ peak, and so on have limitation on extension of the Si—O net structure, the structural distortion of silica little occurs.

The $Q^4/Q^3$ and $Q^4$ chemical shift value of silica can be calculated on the basis of the results of solid-state Si—NMR measurement. In addition, measurement data is analyzed (determination of peak positions) by, for example, a method of dividing and extracting peaks by waveform separation analysis using a Gaussian function or the like.

Content of Metal Impurities:

The silica according to the present invention preferably has such high purity that the total content of metal elements (metal impurities) excluding silicon which constitutes the skeleton of the silica is generally 500 ppm or less, particularly 100 ppm or less, more preferably 50 ppm or less, and most preferably 30 ppm or less. When there is little influence of impurities, the excellent durability, heat resistance, water resistance, and the like can be exhibited. In addition, since the content of metal impurities is low, light deterioration, heat deterioration, time-lapse deterioration, and the like due to contact between the thermoplastic resin used as the binder resin and metal impurities can be suppressed in the humidity-conditioning layer of the humidity-conditioning sheet of the present invention. As a result, the humidity-conditioning sheet of the present invention can be stably used for a long period of time. The metal impurity content of silica can be measured by any one of various elemental analysis methods such as ICP emission spectrochemical analysis and the like.

As described below, the silica according to the present invention may acquire an advantageous function when another component such as specified atoms or atomic groups are purposefully added according to its application and the like. Therefore, whether a component other than silica is added to the silica according to the present invention should be determined according to its application and the like.

In the present invention, one type of the humidity-conditioning particles may be used alone or a mixture of two or more types of them may be used. In addition, the humidity-conditioning particles may be mixed with another humidity-conditioning material and drying agent regardless of whether the humidity-conditioning particles are organic or inorganic.

The particle diameter of the humidity-conditioning particles 3 cannot be unconditionally determined in view of the relationships to the dimensions and applications of the humidity-conditioning sheet and the particle diameter of the thermoplastic resin powder described below. However, when the particle diameter is excessively small, effective voids cannot be formed between the humidity-conditioning particles, and it is difficult to uniformly mix with the thermoplastic resin powder. In contrast, when the particle diameter is excessively large, the humidity-conditioning function of the humidity-conditioning particles cannot be effectively utilized, and the humidity-conditioning sheet is undesirably thickened. Therefore, the humidity-conditioning particles 3 preferably have an average particle diameter of 5 to 1,000 μm, particularly 10 to 900 μm.

In the present invention, the average particle diameter of the humidity-conditioning particles 3 is determined by a laser diffraction/scattering method (water dispersion wet-type method).

As the material of the thermoplastic resin powder 4, any material may be used as long as the humidity-conditioning particles 3 can be bonded together by heat sealing, and the material preferably satisfies the moisture adsorption coefficient and MFR which will be described below. Examples of the material include, but are not particularly limited to, thermoplastic resins, such as polyethylene, polypropylene, ethylene-vinyl acetate copolymers, polyvinyl acetate, saponified ethylene-vinyl acetate copolymers, polyvinyl alcohol, polyester, polyamide, polyurethane, ionomer resins, and the like; and modified products thereof. Preferably, thermoplastic resins, such as polyvinyl acetate, saponified ethylene-vinyl acetate copolymers, polyvinyl alcohol, polyester, polyamide, polyurethane, ionomer resins, and the like; and modified products thereof can be used. These resins may be used alone or as a mixture of two or more.

In the present invention, the thermoplastic resin of the thermoplastic resin powder preferably has a moisture adsorption coefficient of 0.2% or more. With the thermoplastic resin powder having a moisture adsorption coefficient of less than 0.2%, the thermoplastic resin powder 4 exposed in the voids 8 between the humidity-conditioning particles 3 in the humidity-conditioning layer 7 repels water due to strong hydrophobicity, thereby possibly degrading the moisture adsorption/desorption property of the humidity-conditioning sheet, particularly the moisture adsorption property. The moisture adsorption coefficient of the thermoplastic resin is preferably as high as possible, particularly 0.5% or more. The upper limit of the moisture adsorption coefficient of the thermoplastic resin is generally 10% or less.

In the present invention, the moisture adsorption coefficient of the thermoplastic resin is used as an index for hydrophilicity of the thermoplastic resin, but the hydrophilicity of the thermoplastic resin can also be represented by a water contact angle. When the thermoplastic resin of the thermoplastic resin powder used in the present invention is formed into a film by the same method as for a film for measuring the moisture adsorption coefficient as mentioned above, the water contact angle with a film surface, which is measured by a θ/2 method, is preferably 95° or less, particularly 85° or less. The moisture adsorption coefficient does not necessarily correspond to the water contact angle. In some cases, a thermoplastic resin has a small contact angle but has a low coefficient of moisture adsorption, and a thermoplastic resin has a high coefficient of moisture adsorption but has a large contact angle. When both properties are used as indexes, the thermoplastic resin most preferably has a high coefficient of moisture adsorption and a small water contact angle, but any thermoplastic resin is effective to the present invention as long as the coefficient of moisture adsorption is close to 0.2% and relatively low but has a small water contact angle.

The thermoplastic resin of the thermoplastic resin powder 4 used in the present invention preferably has a MFR of 55 g/10 min or less. With the thermoplastic resin having a MFR of over 55 g/10 min and high mobility, the surfaces of the humidity-conditioning particles 3 are widely coated due to mobility in heat sealing, thereby deceasing the exposed surface area of the humidity-conditioning particles 3 and closing the pores of the humidity-conditioning particles 3. Therefore, in some cases, the humidity-conditioning function inherent in the humidity-conditioning particles cannot be effectively exhibited. The MFR of the thermoplastic resin is preferably as small as possible, but when the MFR is excessively small, mobility in heat sealing is excessively low, and thus the humidity-conditioning particles 3 cannot be sufficiently bonded together. Therefore, the MFR of the thermoplastic resin is preferably 1 to 55 g/10 min, particularly 5 to 50 g/10 min.

Although the melting point of the thermoplastic resin is not particularly limited, the melting point is preferably in the range of 50 to 250° C., particularly 80 to 150° C. When the melting point of the thermoplastic resin is less than 50° C., there is a problem that the resin is easily thermally deformed during use at room temperature. On the other hand, when the melting point exceeds 250° C., the base sheet, which will be described below, may be thermally deformed when the humidity-conditioning layer is formed by heat melting.

There is a suitable particle diameter for the thermoplastic resin powder 4 used in the present invention in view of the relationship to the particle diameter of the humidity-conditioning particles 3. When the particle diameter of the thermoplastic resin powder 4 is excessively larger than that of the humidity-conditioning particles 3, the voids 8 cannot be sufficiently formed between the humidity-conditioning particles 3, and the humidity-conditioning particles 3 are buried in the thermoplastic resin powder during formation, thereby failing to sufficiently exhibit the humidity-conditioning function. Even when the particle diameter of the thermoplastic resin powder 4 is excessively small, the humidity-conditioning particles 3 adhere to each other to decrease the void ratio of the humidity-conditioning layer 7. The thermoplastic resin powder having an excessively small particle diameter is hard to obtain as a commercial product and is disadvantageous in low uniformity in mixing with the humidity-conditioning particle.

Therefore, with respect to the average particle diameter of the thermoplastic resin powder 4 relative to the average particle diameter of the humidity-conditioning particles 3, the ratio of (average particle diameter of the thermoplastic resin powder/average particle diameter of the humidity-conditioning particles) is preferably in the range of 1/8 to 15/1, particularly 1/7 to 8/1. The average particle diameter of the thermoplastic resin powder in itself is any value within a range in which the average particle diameter ratio as described above is satisfied, but the particle diameter is preferably about 5 to 900 µm from the viewpoint of easy availability, handleability, and the like.

In the present invention, the average particle diameter of the thermoplastic resin powder is a value determined by a laser diffraction/scattering method (water dispersion wet-type method).

In the present invention, the weight ratio of the thermoplastic resin powder 4 to the humidity-conditioning particles 3 which constitute the humidity-conditioning layer 7 is preferably 1/4 to 4/1, particularly 1/3 to 3/1. When the amount of the thermoplastic resin powder is smaller than this range, the adhesiveness and formability of the humidity-conditioning particles among themselves are degraded, and it is difficult to form the sheet-shaped humidity-conditioning layer. When the amount of the thermoplastic resin powder is larger than this range, the voids between the particles are easily filled with the resin melted in forming, thereby decreasing the void ratio. Further, the resin enters the pores of the humidity-conditioning particles or covers the pores, thereby decreasing the moisture adsorbing/desorbing ability. Therefore, the humidity-conditioning sheet having the excellent moisture adsorbing/desorbing ability cannot be obtained.

In the present invention, the humidity-conditioning layer 7 may contain one type or two or more types of an antibacterial agent and/or an antifungal agent in addition to the humidity-conditioning particles 3 and the thermoplastic resin powder 4 used as the binder. As a result, it is possible to prevent the occurrence of molds and bacterial growth due to moisture adsorbed in the humidity-conditioning layer 7 and thus hygienically maintain the humidity-conditioning sheet.

The antibacterial agent and/or an antifungal agent used in the present invention is roughly divided into two types, i.e., an inorganic type and an organic type. The inorganic antibacterial agent and/or antifungal agent is a metal (silver, copper, or zinc) or a compound thereof, an inorganic/organic composite type, or an oxide photocatalyst type. The organic antibacterial agent and/or antifungal agent is a synthetic type or a natural type.

Examples of the inorganic antibacterial agent include elemental metals such as silver, copper, zinc, and the like; phosphates of at least one of these metals (zirconium phosphate, aluminum phosphate, calcium phosphate, and hydroxyapatite); silicates (zeolite, silica gel, calcium silicate, and clay minerals); molten glass; and compounds carried on activated carbon. Examples of the inorganic/organic composite type include a type in which hydrogen ions present between layers of layered phosphate are substituted by quaternary ammonium salt by ion exchange reaction. Examples of the oxide photocatalyst type include titanium oxide, and the like.

Examples of the organic antibacterial agent include imidazoles, such as 2-(4-thiazolyl)benzimidazole, methyl 2-benzimidazolecarbamate, 2-methylcarbonylaminobenzimidazole, and the like; thiazoles, such as 2-(4-thiocyanomethylthio)benzthiazole and the like; isothiazolines, such as 2-n-octyl-4-isothiazolin-3-one and the like; pyridines, such as 2,3,5,6-tetrachloro-4-(methylsulfone) pyridine, bis(pyridine-2-thiol-1-oxide) zincate, 2-pyridinethiol-1-oxide sodium salt, 2,2'-dithiobispyridine-1-oxide, and the like; triazines, such as hexahydro-1,3,5-tris(2-hydroxyethyl)-S-triazine, and the like; aldehydes, such as α-bromocinnamaldehyde, formalin, and the like; phenols, such as 2,4,4'-trichloro-2'-hydroxydiphenyl ether, 3-methyl-4-isopropylphenol, 2-isopropyl-5-methylphenol, carbolic acid, and the like; biguanides, such as chlorohexidine gluconate and the like; nitrites, such as 2,4,5,6-tetrachloroisophthalonitrile, and the like; halogen compounds, such as 3-iodo-2-propylthiocarbamate and the like; anilides, such as trichlorocarbanilide and the like; disulfides, such as tetramethylthiuram disulfide and the like; thiocarbamates, such as sodium N-methyldithiocarbamate and the like; organic silicates, such as octadecyldimethyl(3-trimethoxypropyl)ammonium chloride and the like; quaternary ammonium salts, such as benzalkonium chloride, benzethonium chloride, and the like; organic metal compounds, such as 10,10'-oxybisphenoxyarsine and the like; alcohols, such as ethanol, propanol, and the like; carboxylic acids, such as propionic acid and the like; esters, such as p-hydroxybenzoate esters, fatty acid monoglyceride, sucrose fatty acid esters, and the like; and natural organic compounds, such as hinokitiol, chitosan, mustard extracts, eucalyptus extracts, and the like.

These compounds can be used alone or as a mixture of two or more.

In the present invention, an inorganic antibacterial agent having a high persistent effect is preferably used. In order to achieve the higher antibacterial/antifungal effect, silver rather than copper and zinc is more preferably used. In order to maintain the antibacterial/antifungal effect over a long period of time, it is more effective to use metal-containing zeolite rather than an elemental metal. Silver-containing zeolite (silver zeolite) is most preferred as the antibacterial/antifungal agent having high efficiency and persistency.

When the amount of the antibacterial/antifungal agent used therein is excessively small, the antibacterial/antifungal effect cannot be sufficiently obtained by the use thereof. When the amount is excessively large, the humidity-conditioning particles are coated with the antibacterial/antifungal agent, thereby degrading the humidity-conditioning ability. Therefore, the amount is preferably about 0.5 to 10 parts by weight relative to a total of 100 parts by weight of the humidity-conditioning particles and the thermoplastic resin powder.

Further, bulky fibrous or plate-shaped filler can be added to the humidity-conditioning layer 7 in order to facilitate the formation of the voids, and hollow filler can be added for imparting thermal insulation. In addition, an antioxidant, an ultraviolet absorber, and a light shielding filler may be added for improving light resistance, activated carbon may be added for imparting deodorant property, and a pigment may be added for imparting graphical design function. Further, a functional filler such as a virus absorber, a virus decomposing agent, a conductive agent, an antistatic agent, or the like may be added. These fillers and agents may be used in combination.

In the present invention, it is essential that the void ratio of the humidity-conditioning layer 7 is 5% or more. When the void ratio of the humidity-conditioning layer 7 is less than 5%, the excellent humidity-conditioning ability cannot be sufficiently obtained by the humidity-conditioning particles 3, and the humidity-conditioning ability cannot be improved by effectively utilizing the voids 8 of the humidity-conditioning layer 7 as, particularly, water retention spaces for moisture control. The void ratio is preferably higher than 5% to some extent, but when the void ratio is excessively high, the ratio of the humidity-conditioning particles is relatively decreased to decrease the humidity-conditioning ability. In addition, the formability and shape retention property of the humidity-conditioning layer are degraded due to the small amounts of the humidity-conditioning particles and the thermoplastic resin powder. Therefore, the void ratio of the humidity-conditioning layer 7 is preferably 5 to 75%, particularly 6 to 50%.

The thickness of the humidity-conditioning layer 7 of the humidity-conditioning sheet of the present invention is not particularly limited and is appropriately determined according to application, i.e., application objects. In order to allow the humidity-conditioning layer to contain a sufficient amount of the humidity-conditioning particles, a certain thickness is required. On the other hand, thinning is required for application to a narrow place. From these viewpoints, the thickness is preferably about 5 to 3,000 µm, particularly 10 to 2,500 µm.

Examples of the base sheets 1 and 2 which can be used in the present invention include air-permeable materials such as nonwoven fabric, woven fabric, Japanese paper, foreign paper, nets, sponge, porous films, and the like; thermoplastic resin films, such as polyethylene films, polypropylene films, polyester films, polyamide films, polyvinyl chloride films, polymethyl methacrylate films, polystyrene films, polyethylene sulfide films, polyether sulfide films, polyether sulfone films, polyphenylene ether films, triacetyl cellulose films, and the like; and metal foils of aluminum, iron, and the like. These base sheets may be used as a laminate of a plurality of layers, for example, an aluminum-deposited resin film, aluminum-deposited paper, or the like.

As shown in FIG. 1, when the base sheets 1 and 2 are provided on both surfaces of the humidity-conditioning layer 7, it is necessary that at least one of the base sheets is composed of a material having air permeability. As shown in FIG. 2, when an adhesive layer 5 is formed on the base sheet 2, the base sheet 2 is not necessarily air-permeable, while the base sheet 1 is required to have air permeability. When a resin film or metal foil having low air-permeability is used as the material, fine holes or slits may be formed in the material used according to demand.

Examples of nonwoven fabric or woven fabric used as the base sheet include synthetic fibers, such as polyester fibers of polyethyleneterephthalate, polytrimethyleneterephthalate, or the like, polyacrylic fibers, polypropylene fibers, polyamide fibers such as nylon 6 or nylon 66, and semisynthetic fibers such as acetate fibers. Combinations of above-described sheets can be used as the base sheet.

The areal weight of nonwoven fabric is preferably in the range of 20 to 100 g/m$^2$ because it can have sufficient air permeability.

Since nonwoven fabric or woven fabric composed of such fibers has fuzz of fibers of several µm on the surface thereof, the humidity-conditioning sheet having higher strength can be obtained due to high adhesiveness to the resin.

The base sheets used in the present invention preferably have an air permeability of 50 to 250 cc/cm$^2$·sec and more preferably 70 to 200 cc/cm$^2$·sec, which is measured according to JIS L 1096 6.27.1 A method (Frazir method). When the base sheets have low air permeability, diffusion of water vapor in the humidity-conditioning layer is a rate-limiting factor, and the moisture adsorbing/desorbing ability of the humidity-conditioning particles are not sufficiently exhibited. When the base sheets have high air permeability, the moisture adsorption/desorption rate of the humidity-conditioning particles is a rate-limiting factor, and the humidity-conditioning effect cannot be sufficiently achieved.

The thickness of the base sheets 1 and 2 is not particularly limited but is generally about 10 to 1,000 µm from the viewpoint of strength and thinning.

The base sheets 1 and 2 may be subjected to antibacterial/antifungal treatment with the above-described antibacterial/antifungal agent, and various paints may be applied to impart a graphical design function and permit printing of a part number, a trade name, and the like.

In the humidity-conditioning sheet 10A shown in FIG. 2, an adhesive used for forming the adhesive layer 5 is not particularly specified, and any known resin such as an acrylic resin, a silicone resin, a rubber resin, or the like can be used.

The separation sheet 6 is not particularly specified, and conventional separating paper (separator) in heavy usage, which has a separation surface treated with silicone, or the like may be used.

The humidity-conditioning sheet 10A provided with the adhesive layer 5 and the separation sheet 6 shown in FIG. 2 enables an easy work by removing the separation sheet 6 to expose the adhesive layer 5 and bonding the surface of the adhesive layer 5 to a surface to be worked.

Although FIGS. 1 and 2 each shows the humidity-conditioning sheet having the base sheets 1 and 2 provided on both surfaces of the humidity-conditioning layer 7, the base sheet may be provided on one of the surface of the humidity-conditioning layer 7. The humidity-conditioning sheet of the present invention may include only the humidity-conditioning layer without the base sheets.

The humidity-conditioning sheet having the base sheets 1 and 2 provided on both surfaces of the humidity-conditioning layer 7 as shown in FIGS. 1 and 2 can be produced by, for example, the following method.

First, the humidity-conditioning particles and the thermoplastic resin powder, and if required, the antibacterial/antifungal agent and the like are scattered on one of the base sheets, and the other base sheet is laminated thereon. In scattering, the humidity-conditioning particles, the thermoplastic resin powder, and the like may be previously mixed and scattered as a mixture or may be separately scattered. However, preferably, these materials are previously mixed and scattered as a mixture as long as the humidity-conditioning property is not influenced. As a scattering method, scattering by free falling from the bottom of a hopper, a method in which the materials are continuously supplied to a roll having recesses, such as a gravure roll, to be supplied onto one of the base sheets, a method of scattering by air blowing, or the like can be used. When a powder is desired to be more uniformly mixed, another method can be used, in which a mixed powder is dispersed in a medium such as water or a solvent, and the resulting slurry is applied on one of the base sheets by spray coating or die coating and then dried. However, a dry method of spraying the slurry is preferred because of a difficulty in thick coating, and energetic disadvantage due to the need for a dry process in the case of liquid coating.

In this way, the humidity-conditioning particles, the thermoplastic resin powder, and the other additives are scattered on one of the base sheets, and the other base sheet is laminated thereon. Then, the laminate is heated or pressed under heating to bond together the humidity-conditioning particles with the thermoplastic resin powder and bond the base sheets to the humidity-conditioning layer.

The heating method is not particularly limited, and heating by contact-type heat conduction using a hot press, a heating roll, a heating belt, or the like, or heating by noncontact-type radiant heat using an infrared heater or a gas burner heater can be used. In the present invention, the heat-conduction heating method is preferred. The heating temperature may be a temperature which permits bonding integration between the humidity-conditioning particles and between the humidity-conditioning particles and the base sheets by melting the thermoplastic resin, depending on the thermoplastic resin powder used.

As the pressure method, for example, a method using a hot press or a method of passing between pressure rolls can be used. The degree of pressure may be appropriately determined in consideration of bonding strength, crashing of the humidity-conditioning particles, securement of the void ratio, the influence on air permeability, and the like.

The humidity-conditioning sheet can be efficiently formed by a powder lamination method which will be described below. Use of this method enables the continuous production of the humidity-conditioning sheet of the present invention.

Figure 3:
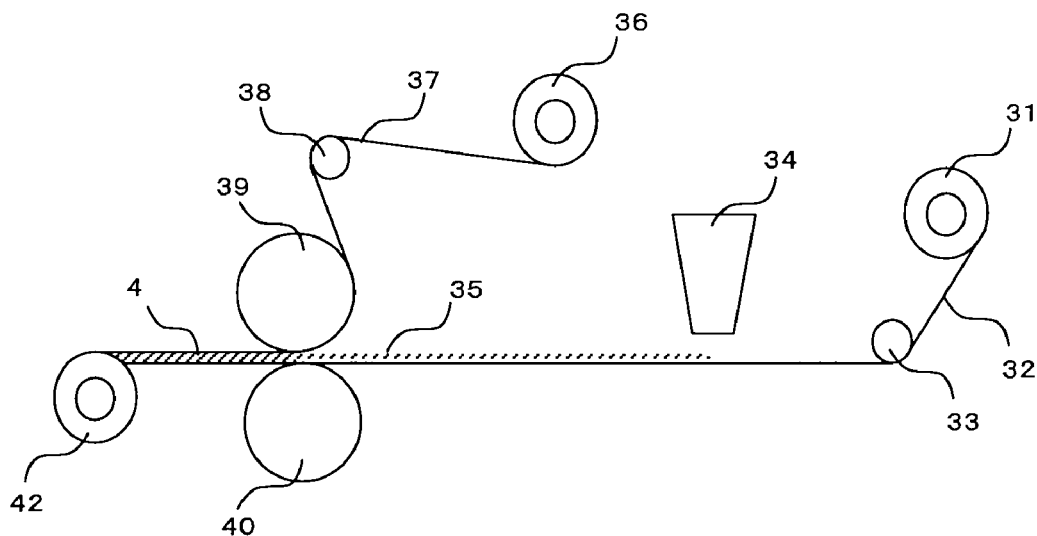
FIG. 3 is a drawing schematically showing a configuration of a production line of a heating roller-type powder lamination apparatus.

FIG. 3 schematically shows a production line of a heating roller-type powder lamination apparatus. In the production line, an upper sheet roller 36 for supplying an upper sheet 37 and a lower sheet roller 31 for supplying a lower sheet 32 are rotatably supported on the upstream side. In addition, a mixed powder feed hopper 34 is provided downstream of the lower sheet roller 31 so as to be disposed above a transfer passage of the lower sheet 32 supplied from the roller 31. In the hopper 34, at least the humidity-conditioning particles and the thermoplastic resin powder are mixed at a certain ratio and stored so that the mixed powder is scattered when the lower sheet 32 passes below the mixed powder feed hopper 34. The mixed powder held between the upper and lower sheets is passed between a rotatably supported upper heating roller 39 and a rotatably supported lower silicone rubber roller 40 to heat-melt the thermoplastic resin powder and bond the humidity-conditioning particles between the upper and lower sheets. The inside of the lower silicone rubber roller 40 can be heated with hot water, stream, or the like during use. Then, a humidity-conditioning sheet 41 of the present invention can be continuously produced through a take-up roller provided on the downstream side of the production line.

Figure 4:
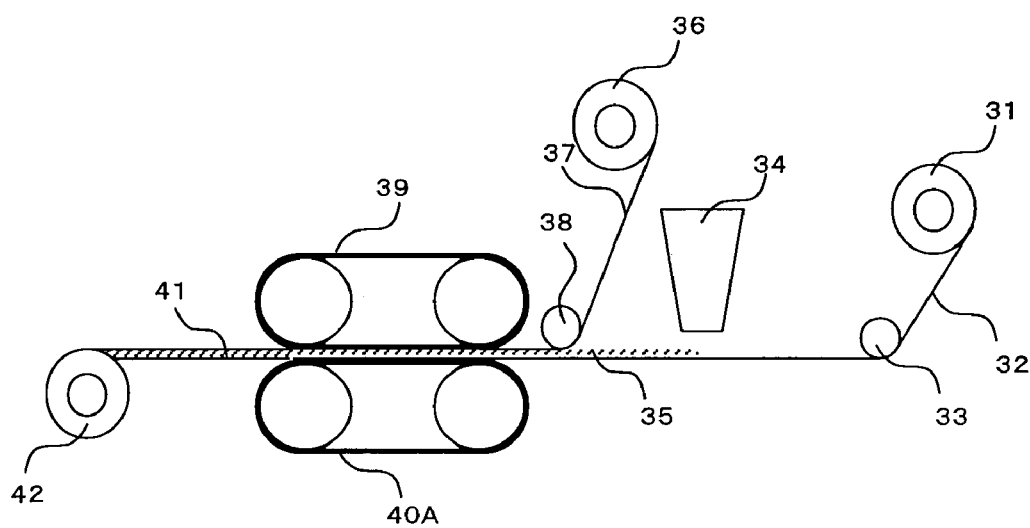
FIG. 4 is a drawing schematically showing a configuration of a production line of a heating belt-type powder lamination apparatus.

FIG. 4 shows a production line of a heating belt-type powder lamination apparatus. In FIG. 4, the same member as in FIG. 3 is denoted by the same reference numeral. Reference numeral 40A denotes a lower heating belt. The basic configuration of the apparatus shown in FIG. 4 is substantially the same as the apparatus shown in FIG. 3 except that a thermocompression bonding step after scattering of the mixed powder is different. The apparatus shown in FIG. 4 is capable of long-term heating because of the heating belt type. Therefore, the apparatus shown in FIG. 4 is capable of uniformly heat-melting the thermoplastic resin powder in the mixed powder at a low temperature and continuously forming a thick sheet as compared with the apparatus shown in FIG. 3. Thus, in order to continuously form the humidity-conditioning sheet of the present invention, the heating belt-type powder lamination apparatus shown in FIG. 4 is more preferred than the heating roller-type powder lamination apparatus shown in FIG. 3.

When the base sheets are subjected to antibacterial/antifungal treatment, a chemical may be sprayed, fumigated, or the like after the thermocompression bonding treatment. Further, when the adhesive layer 5 is formed, the adhesive layer 6 and the separation sheet 6 may be laminated thereafter.

When the laminated humidity-conditioning sheet having the base sheet provided on only one of the surfaces of the humidity-conditioning layer or the humidity-conditioning sheet including only the humidity-conditioning layer is produced, detachable base sheets may be used, and one or both of the base sheets may be removed after the thermocompression bonding treatment in the above-described production method.

The thus-formed humidity-conditioning sheet or laminated humidity-conditioning sheet can be processed into a micro part so that it can be suitably used for a sensor, a camera, or the like. For example, a micro part can be manufactured by punching or slitting. Further, the end surfaces can be partially subjected to pressure-bonding by a high-frequency welder, thermal embossing, ultrasonic waves, an adhesive, or the like in order to prevent falling of the humidity-conditioning particles from the end surfaces and breakage of the humidity-conditioning sheet or laminated humidity-conditioning sheet.

As described above, in the present invention, at least one type of silicon compound, particular silica, is preferred as the humidity-conditioning particles.

The method for producing the silica according to the present invention is described below.

The method for producing the silica according to the present invention is not particularly limited, and the silica can be produced by any known method. Examples of methods well known as a silica producing method include the following methods:

i. a method of neutralizing liquid glass with an acid such as sulfuric acid or the like and then gelating the glass;

ii. a method of hydrolyzing alkoxysilane and then gelating it; and iii. a method of forming pores using alkoxysilane or liquid glass as a raw material and a surfactant as an organic template (so-called micellar template silica).

Although an example of the method for producing the silica according to the present invention is described below, the method is only an example, and the method producing the silica according to the present invention is not limited to the example below.

Unlike a conventional sol-gel method, this method includes a hydrolysis/condensation step of forming silica hydrogel through a hydrolysis step of hydrolyzing silicon alkoxide or alkali silicate (preferably silicon alkoxide) and a condensation step of condensing the resulting silica hydrosol; and a physical properties controlling step of forming silica gel having a desired physical property range by hydrothermal treatment of the silica hydrogel without aging following the hydrolysis/condensation step.

Examples of the silicon alkoxide used as the raw material of the silica according to the present invention include tri- or tetra-alkoxysilanes each having a lower alkyl group with 1 to 4 carbon atoms, such as trimethoxysilane, tetramethoxysilane, triethoxysilane, tetraethoxysilane, tetrapropoxysilane, tetrabutoxysilane, and the like; and oligomers thereof. In particular, tetramethoxysilane or tetraethoxysilane, or an oligomer thereof, particularly tetramethoxysilane or an oligomer thereof, is preferably used because the silica having good pore properties can be obtained. The main reason for this is that the silicon alkoxide can be easily purified by evaporation to produce a high-purity product, and thus it is preferred as a raw material for high-purity silica. The total content of metal elements (metal impurities) belonging to the alkali metals or alkaline earth metals in the silicon alkoxide is generally 100 ppm or less, preferably 50 ppm or less, more preferably 10 ppm or less, and most preferably 1 ppm or less. The content of the metal impurities can be measured by the same method as that for measuring the impurity content in general silica.

In the present invention, first, in the hydrolysis/condensation step, the silicon alkoxide is hydrolyzed in the absence of a catalyst, and the resulting silica hydrosol is condensed to form silica hydrogel.

The amount of the water used for hydrolyzing the silicon alkoxide is arbitrarily determined, but hydrolysis is performed with water of, per mole of the silicon alkoxide, generally 2 times by mol or more, preferably 3 times by mol or more, particularly 4 times by mole or more, and generally 20 times by mol or less, preferably 10 times by mol or less, particularly 8 times by mole or less. Hydrolysis of the silicon alkoxide produces silica hydrogel and alcohols, and the produced silica hydrosol is successively condensed to form silica hydrogel.

The hydrolysis temperature is also arbitrarily determined. The hydrolysis temperature is usually room temperature to 100° C., but hydrolysis can be performed at a higher temperature by maintaining a liquid phase under pressure. The reaction time required for hydrolysis cannot be determined unconditionally because it depends on the reaction solution composition (the type of silicon alkoxide used and the molar ratio to water) and the reaction temperature, and the time required to gelation varies. In order to obtain silica having excellent pore characteristics like the silica according to the present invention, the time is preferably determined so that the fracture stress of the hydrogel does not exceed 6 MPa.

The hydrolysis can be accelerated by coexistence of an acid, an alkali, a salt, or the like as a catalyst in the hydrolysis reaction system. However, use of such a catalyst brings about aging of the hydrogel formed as described above, and is thus not preferable in producing the silica according to the present invention.

In the hydrolysis of the silicon alkoxide, it is important to carry out sufficient stirring. For example, when a stirrer having stirring blades provided on a rotational axis is used, the stirring speed (the number of rotations of the rotational axis) is generally 30 rpm or more, preferably 50 rpm or more, depending on the shape and number of the stirring blades, the contact area with the solution, and the like.

However, if the stirring speed is too fast, there is the possibility that droplets produced in a vessel block off various gas lines or adhere to an inner wall of the reactor vessel to thereby worsen heat conduction and have a bad influence on temperature management, which is important in controlling physical properties. Further, the extraneous matters adhering to the inner wall may separate and get mixed into products to thereby make worse the quality. On such grounds, it is preferred that the stirring speed is usually 2,000 rpm or less, particularly 1,000 rpm or less.

As a method for stirring two separating liquid phases (water phase and silicon alkoxide phase) in the present invention, any stirring method is applicable as long as it can accelerate the reaction. In particular, as a preferable apparatus that can sufficiently mix these two liquid phases, the following (i) and (ii) are mentioned.

(i): A stirrer having the stirring blades whose rotation axis is inserted vertically or slightly obliquely into the liquid surface so as to generate up-and-down flow.

(ii): A stirrer having the stirring blades whose rotation axis is in a direction substantially parallel to the interface between the liquid phases so as to generate agitation between the two liquid phases.

Preferably, when the above-described stirrer (i) or (ii) is used, the rotational speed of the stirring blades is such a speed that a circumferential speed of the stirring blades (a speed of the edges of stirring blades) is usually between 0.05 m/s or more, particularly 0.1 m/s or more, and usually 10 m/s or less, particularly 5 m/s or less, further particularly 3 m/s or less.

The shape and the length of the stirring blades can be selected appropriately without restraint. For example of the stirring blades, a propeller blade, a plain blade, a inclined plain blade, a pitch plain blade, a plain disc turbine blade, a curved blade, a phaudler-type blade, a Bullmargin-type, and the like are used.

The width of the blades, the number of the blades, the angle of inclination of the blades, etc. can be selected appropriately according to the shape and size of a reactor and a stirring power to be used. For example of a preferable stirrer, a ratio (b/D) of the width of the blade (the width of the blade in the direction of the rotation axis: b) to the internal diameter of a reactor (the maximum diameter D of the surface of liquid phase which defines a vertical plane with respect to the direction of the rotation axis) is 0.05 to 0.2, an angle of inclination (θ) is within a range of 90°±10°, and the number of the blades is 3 to 10.

In particular, an apparatus having a structure such that the rotation axis is disposed above the surface of a liquid in a reactor vessel, and that the stirring blades are attached to the tip of a shaft extended from the rotation axis, is preferably used from the viewpoints of stirring efficiency and maintenance of the apparatus.

In the hydrolysis reaction of silicon alkoxide, the silicon alkoxide is hydrolyzed to form silica hydrosol at first, then the silica hydrosol successively undergoes condensation reaction while viscosity of the reaction solution increases, and at last the reaction solution is gelated to form silica hydrogel.

Next, in the present invention, as the physical property-controlling step, the silica hydrogel generated from the hydrolysis is successively subjected to a hydrothermal treatment without substantially aging so that the silica hydrogel does not increase its hardness. By hydrolyzing silicon alkoxide, soft silica hydrogel is generated. By a method of first aging or drying the hydrogel so as to stabilize its physical properties, and thereafter carrying out hydrothermal treatment, it is difficult to produce the silica according to the present invention.

The above-described fact that silica hydrogel generated from the hydrolysis is immediately subjected to hydrothermal treatment without substantially aging means that the silica hydrogel is subjected to the subsequent hydrothermal treatment while maintaining a soft state immediately after the generation of silica hydrogel.

Specifically, it is preferable to carry out the hydrothermal treatment of silica hydrogel usually within 10 hours, particularly within 8 hours, more particularly within 6 hours, still more particularly within 4 hours, from the time when the silica hydrogel is produced.

In an industrial plant or the like, there is a case where a large quantity of silica hydrogel is generated and stored in a silo or the like for a while, and then hydrothermal treatment is carried out on the silica hydrogel. In such a case, a time from the silica hydrogel generates until it is subjected to hydrothermal treatment, i.e., a standing time, may exceed the above-defined range. In such a case, in order to prevent substantial aging of silica hydrogel, it is sufficient to, for example, prevent liquid components in the silica hydrogel from drying during the storage of silica hydrogel in a silo.

Specifically, it is preferred to close the silo or adjust the humidity in the silo. Also preferred is to immerse the silica hydrogel in water or another solvent during still standing.

During the still standing of silica hydrogel, it is also preferred to keep the temperature low, for example, usually 50° C. or less, particularly 35° C. or less, further particularly 30° C. or less.

Another method for preventing substantial aging of silica hydrogel is to prepare silica hydrogel by controlling the composition of the raw material in advance so that the concentration of silica in silica hydrogel becomes low.

The advantage caused by the hydrothermal treatment of silica hydrogel without substantial aging and the reason for the advantage are considered as follows.

If silica hydrogel is aged, a macrostructural network structure composed of —Si—O—Si— bonds is formed throughout the whole silica hydrogel. It is presumed that the network structure spreading throughout the whole silica hydrogel becomes an obstacle to formation of mesopores during hydrothermal treatment. On the other hand, if silica hydrogel is prepared using a raw material with a previously controlled composition so that the concentration of silica in silica hydrogel becomes low, it is presumed that the formation of cross-linking can be suppressed during the still standing of silica hydrogel and thus silica hydrogel is prevented from aging.

Therefore, in the silica producing method, it is important to subject silica hydrogel to the immediate hydrothermal treatment without substantial aging.

When an acid, alkali, salt, or the like is added to the system of hydrolysis reaction of silicon alkoxide, or the temperature for the hydrolysis reaction is made excessively severe, aging of hydrogel may be accelerated. In addition, in various post-treatments subsequent to the hydrolysis, such as water-washing, drying, and still standing, it is also undesirable to expose silica hydrogel unnecessarily to high temperature or long time.

The silica hydrogel obtained by the hydrolysis of the silicon alkoxide is preferably subjected to a grinding treatment or the like so as to give an average particle diameter of 10 mm or less, particular 5 mm or less, preferably 1 mm or less, further preferably 0.5 mm or less before the hydrothermal treatment is conducted.

In the production method for the silica according to the present invention, as described above, it is important to subject the silica hydrogel to a hydrothermal treatment immediately after the formation thereof. In the production method for the silica according to the present invention, however, it is only necessary that the silica hydrogel subjected to the hydrothermal treatment be not aged. It is therefore not always necessary to immediately subject the silica hydrogel to the hydrothermal treatment immediately after the formation thereof, and, for example, the silica hydrogel may be subjected to the hydrothermal treatment after still standing at a low temperature for a while.

If the silica hydrogel is not subjected to a immediate hydrothermal treatment immediately after the formation as described above, it is preferred to concretely check an aging state of hydrogel prior to the hydrothermal treatment. The aging state of hydrogel may be exactly checked using any possible method, for example, a method using hardness of hydrogel. That is, as described above, by carrying out hydrothermal treatment of the soft hydrogel whose fracture stress is usually 6 MPa or less, it is possible to obtain silica having the physical property ranges defined in the present invention. The fracture stress of the soft hydrogel is preferably 3 MPa or less, more preferably 2 MPa or less.

Any desired conditions for the hydrothermal treatment may be used. Namely, water may be either liquid or gas, although it is preferable to use liquid water so as to mix with silica hydrogel into the form of slurry for the hydrothermal treatment. Upon the hydrothermal treatment, silica hydrogel to be treated is made into the form of slurry by adding water in an amount of usually 0.1 time by weight or more, preferably 0.5 time by weight or more, further preferably 1 time by weight or more, and usually 10 times by weight or less, preferably 5 times by weight or less, further preferably 3 times by weight or less with respect to silica hydrogel. Then the slurry is subjected to a hydrothermal treatment at a temperature of usually 30° C. or more, preferably 40° C. or more, more preferably 100° C. or more, and usually 250° C. or less, preferably 200° C. or less, for a time of usually 0.1 hour or more, preferably 1 hour or more, and usually 100 hours or less, preferably 10 hours or less. If the temperature of the hydrothermal treatment is excessively low, it may be difficult to increase the pore volume.

The water used in the hydrothermal treatment may contain an organic solvent. Specific examples of the organic solvent include methanol, ethanol and propanol that are lower alcohols. When silica hydrogel obtained by hydrolyzing, for example, an alkoxysilane is subjected to the hydrothermal treatment, the solvent may be an alcohol derived from the alkoxysilane that is the raw material of the silica hydrogel.

The content of the solvent in the water used in the hydrothermal treatment may be optional, but it is preferred to less contain the solvent. For example, when such silica hydrogel obtained by hydrolyzing the alkoxysilane as described above is subjected to the hydrothermal treatment, the silica hydrogel is washed with water, and the washed silica hydrogel is used in the hydrothermal treatment, whereby silica having excellent pore properties and a large pore volume can be prepared even when the hydrothermal treatment is conducted at a temperature lowered to about 150° C. Alternatively, even when the hydrothermal treatment is conducted with water containing the solvent, the silica according to the present invention can be easily obtained by conducting the hydrothermal treatment at a temperature of about 200° C.

Among the conditions for hydrothermal treatment described above, the diameter and pore volume of the resultant silica tends to become larger as the temperature becomes higher. In addition, the specific surface area of the resultant silica reaches the maximum and then tends to slowly decrease with the treatment time. In consideration of these tendencies, it is preferred to appropriately select the conditions according to the desired physical properties. For example, when attention is given to the humidity-conditioning ability, in order to produce silica which exhibits the high humidity-conditioning ability, the hydrothermal treatment temperature is preferably in the range of 100° C. to 200° C. It is generally preferable to set a higher temperature for hydrothermal treatment than that for the hydrolysis reaction since hydrothermal treatment is carried out for the purpose of modifying properties of silica.

In order to prepare silica which is excellent in microstructural homogeneity, the hydrothermal treatment is preferably conducted under fast heating rate conditions so that the temperature within the reaction system reaches the intended temperature within 5 hours. More specifically, it is preferable to adopt a value within a range of usually 0.1° C./min or more, preferably 0.2° C./min or more, and usually 100° C./min or less, preferably 30° C./min or less, more preferably 10° C./min or lees, as an average heating rate from the beginning of heating to arrival at the target temperature when the silica hydrogel is charged into a vessel to treat it.

A heating method making good use of a heat exchanger or a heating method in which hot water prepared in advance is charged is also preferred because the heating speed can be shortened. When the heating rate falls within the above range, the heating may be conducted stepwise. When a long time is required until the temperature within the reaction system reaches the intended temperature, there is a possibility that the aging of the silica hydrogel may be caused to progress during the heating to deteriorate the microstructural homogeneity.

The heating time required to reach the above-intended temperature is preferably within 4 hours, more preferably within 3 hours. The water used in the hydrothermal treatment may also be preheated for the purpose of shortening the heating time.

If the temperature or duration time for hydrothermal treatment is outside the above-described range, it may be difficult to obtain the silica according to the present invention. For example, if the temperature for hydrothermal treatment is excessively high, the pore diameter and pore volume of silica becomes excessively large and the pore distribution of silica becomes broad. On the contrast, if the temperature for hydrothermal treatment is excessively low, the resultant silica includes little cross-linkages and is hence low in thermal stability, causing lack of a peak in a pore distribution or an extremely small $Q^4/Q^3$ value in solid-state Si—NMR.

The hydrothermal treatment in ammonia water brings about the same effect at a lower temperature compared with hydrothermal treatment in pure water. Besides, the resultant silica obtained by hydrothermal treatment in ammonia water generally exhibits higher hydrophobicity compared with that obtained by hydrothermal treatment using ammonia-free water. Extremely high hydrophobicity is obtained by carrying out the hydrothermal treatment at a relatively high temperature of 30° C. or more, preferably 40° C. or more, and 250° C. or less, preferably 200° C. or less. The concentration of ammonia in ammonia water is preferably 0.001% by weight or more, further preferably 0.005% by weight or more, and preferably 10% by weight or less, further preferably 5% by weight or less.

The resultant silica according to the present invention is dried under appropriate conditions. The drying conditions are arbitrarily determined, but drying is carried out at a temperature of usually 40° C. or more, preferably 60° C. or more, and usually 200° C. or less, preferably 120° C. or less. A drying method is not particularly limited, and it may be either a batch type or continuous type, or may be executed either under normal pressure or under reduced pressure. Above all, vacuum drying is preferred not only for the reason that it enables quick drying of silica, but also for the reason that it increases the pore volume and specific surface area of the obtained silica.

If the resultant silica contains a carbon content originating from silicon alkoxide being raw material, it is preferable to calcine at a temperature of usually 400 to 600° C. to eliminate the carbon content. It is also preferable to calcine at a maximum temperature of 900° C. in order to control conditions of the silica surface. Further, a surface treatment may be performed with a silane coupling agent, an inorganic salt, or any of various organic compounds in order to control hydrophilicity/hydrophobicity. Any type of silane coupling agent may be used for the surface treatment, and for example, the silane coupling agents described below can be used for introducing useful organic groups.

Furthermore, after crushed and classified if necessary, the silica according to the present invention is obtained as the final product.

<Silane Coupling Agent>

The silane coupling agent is a general name for compounds each having an organic group directly bonded to a silicon atom. Specific examples of the silane coupling agent include compounds represented by the following formulae (I) to (IV):

$$X_3SiR^1 \qquad (I)$$

In the formula (I), X independently represents a hydrolyzable silyl group which produces a silanol group rich in reactivity by hydrolysis with atmospheric moisture or moisture adsorbed on an inorganic surface or water in an aqueous solution. The specific type is not particularly limited, and any conventional known type can be used. For example, a lower alkoxy group generally having 1 to 4 carbon atoms, an acetoxy group, a butanoxime group, a chloro group, or the like can be used. These hydrolyzable silyl groups may be used alone or in any combination of two or more at any ratio.

Further, $R^1$ represents a monovalent group among the above-described organic groups.

The silane coupling agent represented by the formula (I) is most generally used. Specific examples thereof include 3-glycidoxypropyl trimethoxysilane, 2-(3,4-epoxycyclohexyl) ethyltrimethoxysilane, 3-aminopropyltrimethoxysilane, 3-aminopropyltriethoxysilane, 4-aminobutyltriethoxysilane, p-aminophenyltrimethoxysilane, N-(2-aminoethyl)-3-aminopropyltrimethoxysilane, aminoethylaminomethylphenethyltrimethoxysilane, N-(6-aminohexyl)aminopropyltrimethoxysilane, 3-chloropropyltrimethoxysilane, 3-chloropropyltrichlorosilane, (p-chloromethyl)phenyltrimethoxysilane, 4-chlorophenyltrimethoxysilane, 3-methacryloxypropyltrimethoxysilane, 3-methacryloxypropyltriethoxysilane, 3-acryloxypropyltrimethoxysilane, styrylethyltrimethoxysilane, 3-mercaptopropyltrimethoxysilane, vinyltrimethoxysilane, vinyltriethoxysilane, vinyltrichlorosilane, vinyltriacetoxysilane, vinyl tris(2-methoxyethoxy)silane, trifluoropropyltrimethoxysilane, and the like.

$$X_2SiR^2R^3 \quad (II)$$

In the formula (II), X independently represents the same hydrolyzable silyl group as X in the formula (I).

Further, $R^2$ and $R^3$ each represent the same monovalent organic group as $R^1$ in the formula (I). $R^2$ and $R^3$ may be the same or different from each other.

Specific examples of the silane coupling agent represented by the formula (II) include dimethyldimethoxysilane, dimethyldiethoxysilane, diphenyldimethoxysilane, diphenyldiethoxysilane, diphenyldichlorosilane, and the like.

$$XSiR^4R^5R^6 \quad (III)$$

In the formula (III), X independently represents the same hydrolyzable silyl group as X in the formula (I).

Further, $R^4$, $R^5$, and $R^6$ each represent the same monovalent organic group as $R^1$ in the formula (I). $R^4$, $R^5$, and $R^6$ may be the same or different from each other.

Specific examples of the silane coupling agent represented by the formula (III) include trimethylmethoxysilane, trimethylethoxysilane, trimethylchlorosilane, triphenylchlorosilane, and the like.

$$(X_3Si)_mR^7 \quad (IV)$$

In the formula (IV), X independently represents the same hydrolyzable silyl group as X in the formula (I).

Further, $R^7$ represents a m-valent organic group, and m represents an integer of 2 or more.

Specific examples of the silane coupling agent represented by the formula (IV) include various organic polymers or oligomers each having a plurality of hydrolyzable silyl groups bonded as side chains.

The specific compounds represented by the formulae (I) to (IV) are some of commercially available silane coupling agents, and are described in further detail in "Optimum Use Technique of Coupling Agent" Chapter 9: List of Coupling Agents and Allied Products, issued by Science and Technology Laboratory (Kagaku-gijutu Sougo Kenkyu-sho).

The silane coupling agent which can be used in the present invention are not limited to these examples.

After the hydrothermal treatment, the water contained in the silica is preferably replaced with the hydrophilic organic solvent, and the silica is then dried, whereby shrinkage of the silica in the drying step can be prevented, and the pore volume of the silica can be kept large to provide silica having excellent pore properties and a large pore volume. The reason for it is not clearly known, but is considered to be attributable to such a phenomenon described below.

A liquid component in the silica slurry after the hydrothermal treatment is composed mainly of water. Since molecules of the water strongly interact with the surface of the silica, it is considered to require a great quantity of energy for completely removing the water from the silica.

When the drying process (for example, drying under heating) is performed under conditions in which a great amount of water is present, water applied with thermal energy reacts with an unreacted silanol group to change the structure of the silica according to the present invention. The most marked change of this structural change is condensation of silica skeletons, and it is considered that the silica is locally made high density by the condensation. Since the silica skeletons have a three-dimensional structure, the local condensation (high densification of silica skeletons) of the skeletons affects the pore properties of the overall silica particles formed by the silica skeletons. As a result, it is considered that the particles shrink to shrink the pore volume and pore diameter thereof.

Therefore, for example, the liquid component (containing a great amount of water) in the silica slurry is replaced with the hydrophilic organic solvent, whereby water in the silica slurry can be removed to prevent such shrinkage of the silica as described above.

Any organic solvent may be used as the hydrophilic organic solvent used in the present invention so far as it can dissolve water in plenty on the basis of the above-described consideration. In particular, those undergoing great intramolecular polarization are preferred. Those having a dielectric constant of at least 15 are more preferred.

In the above-described production method of the silica according to the present invention, it is preferred to remove the hydrophilic organic solvent in the drying step after removing the water by the hydrophilic organic solvent for the purpose of providing high-purity silica. Accordingly, the hydrophilic organic solvent is preferably a solvent having a low boiling point, which can be easily removed by drying (for example, drying under heating, drying under reduced pressure, or the like). The boiling point of the hydrophilic organic solvent is generally 150° C. or less, particularly 120° C. or less, and preferably 100° C. or less.

Specific examples of the hydrophilic organic solvent include alcohols, such as methanol, ethanol, propanol, butanol, and the like; ketones, such as acetone, methyl ethyl ketone, and diethyl ketone, and the like; nitrites, such as acetonitrile and the like; amides, such as formamide, dimethylformamide, and the like; aldehydes; and ethers. Among these, alcohols and ketones are preferred, and lower alcohols such as methanol, ethanol, propanol and the like are particularly preferred. In order to produce the silica according to the present invention, these exemplified hydrophilic organic solvents may be used either singly or in any combination at any mixing proportions.

The hydrophilic organic solvent used may contain water as long as the water can be removed. It is naturally preferred that the content of water in the hydrophilic organic solvent be lower, and it is preferable that the water content is generally 20% by weight or less, preferably 15% by weight or less, more preferably 10% by weight or less, particularly 5% by weight.

In producing the silica according to the present invention, the replacing treatment with the hydrophilic organic solvent may be performed at any temperature under any pressure. It is preferred that the treatment temperature be generally 0° C. or more, preferably 10° C. or more, and generally 100° C. or less, preferably 60° C. or less. The treatment pressure may be any of ordinary pressure, pressurization, and reduced pressure.

The amount of the hydrophilic organic solvent brought into contact with the silica slurry may be any amount. However, if the amount of the hydrophilic organic solvent used is excessively little, the progress speed of the replacement becomes insufficient. If the amount is excessively great on the other hand, the effect of the hydrophilic organic solvent corresponding to the increase of the amount used is saturated though the replacement efficiency is enhanced, and it is economically not preferable to use such a great amount of hydrophilic organic solvent. Thus, the amount of the hydrophilic organic solvent used is generally 0.5 to 10 times by volume as much as the bulk volume of the silica. This replacing process with the hydrophilic organic solvent may be preferably performed repeatedly several times because the replacement of water is more surely made.

The contact of the hydrophilic organic solvent with the silica slurry may be conducted by any method. Examples thereof include a method in which the hydrophilic organic solvent is added while stirring the silica slurry in a stirring vessel, a method in which the silica separated from the silica slurry by filtration is charged into a packed column, and the hydrophilic organic solvent is passed through the packed column, and a method in which the silica slurry is placed and immersed in the hydrophilic organic solvent to leave it at rest.

Completion of the replacing process with the hydrophilic organic solvent may be determined by measuring a water content of the liquid component in the silica slurry. For example, the silica slurry is sampled periodically to measure the water content, and a point that the water content is reduced to generally 5% by weight or less, preferably 4% by weight or less, more preferably 3% by weight or less may be regarded as an end point. The measurement of the water content may be performed by any method. For example, the Karl Fischer's method may be mentioned.

After the replacing process with the hydrophilic organic solvent, the silica is separated from the hydrophilic organic solvent and dried, whereby the silica according to the present invention can be prepared. As a separating method at this time, any conventionally known solid-liquid separation method may be used. More specifically, for example, decantation, centrifugation, filtration, or the like may be selected according to the size of silica particles to conduct solid-liquid separation. These separation methods may be used either singly or in any combination thereof.

The silica produced as described above is generally granulated by grinding and classification and used as particulate silica. The shape of the silica particles produced is not particularly limited and any shape, for example, a spherical shape, another lump shape having an undefined form, a ground fine shape (ground shape), or a granular shape formed by collecting ground particles, may be used. From the viewpoint of cost, a ground shape or a granular shape formed by collecting ground particles is preferred because the particle diameter can be easily controlled. Further, the silica may be formed in a honeycomb-like shape. The particle diameter of the silica is appropriately determined according to use conditions.

Further, any desired method may be used for each of grinding and classification.

Specifically, for example, a sieve, a gravitational classifier, a centrifugal classifier, or the like may be used for classifying the silica.

In order to grind the silica, for example, a device or tool, such as a ball mill (a tumbling mill, a vibrating ball mill, a planetary mill, or the like), an agitation mill (a tower mill, an agitation tank-type mill, a flow tube-type mill, an annular mill, or the like), a high-speed rotation pulverizing mill (a screen mill, a turbo-type mill, a centrifugal classification mill), a jet grinder (a circulation jet mill, a collision-type mill, or a fluidized-bed jet mill), a shear mill (a grinder or an ang-mill), a colloid mill, a mortar, or the like can be used. As a grinding state, either a wet type or a dry type may be used, but a wet method is preferred for grinding the silica to a relatively small diameter. In the wet method, as a dispersion medium, water, any organic solvent such as alcohol or the like, or a mixed solvent of two or more solvents may be used according to purposes. When unnecessarily high pressure or shearing force is applied for a long time during grinding, the pore characteristics of the silica may be degraded.

When the silica produced by the above-described method is formed into particles by grinding or the like, the ground silica particles (primary particles) may be granulated by a known method to prepare particulate (e.g., spherical) secondary particles. When the primary particle diameter is 2 μm or less, generally, secondary silica particles can be prepared only by drying water slurry of the primary particles without mixing with a binder resin. However, when the primary particle diameter exceeds 2 μm, a binder resin is often required for forming secondary particles.

Any substance may be used as the binder resin for producing the secondary particles. For example, when the particles are dissolved in water, sugar, dextrose, corn syrup, gelatin, carboxymethyl cellulose (CMC), polyvinyl alcohol (PVA), another water-soluble polymer, liquid glass, silicon alkoxide hydrolyzed liquid (also can be used for a solvent system), or the like can be used. When the particles are dissolved in a solvent, wax, lacquer, Sirac, an oil-soluble polymer, or the like can be used. These binder resins may be used alone or in any combination of two or more at any ratio. However, in order to the secondary particles without degrading the porous properties of the silica, it is preferred that the binder resin is not used. If the binder resin is unavoidably used, it is preferred to minimize the amount of the binder resin used and to use a high-purity binder resin containing small amounts of metal impurities which induce changes in the physical properties of the silica.

As described above, any granulation method (grinding method) may be used for the silica, and typical examples of the method include a tumbling method, a fluidized-bed method, an agitation method, a disintegration method, a compression method, an extrusion method, a spray method, and the like. In order to prepare silica particles having the controlled pore properties according to the present invention, it is important to carefully select the type, amount and purity of the binder resin used and not to apply unnecessary pressure during granulation of the silica.

The example of the method for producing the silica according to the present invention is described above, but the above-described method for producing the silica according to the present invention is only an example, and the production method should not be substantially limited.

EXAMPLES

Although the present invention will be described in further detail below with reference to examples and comparative examples, the present invention is not limited to these examples within the scope of the gist of the invention. Hereinafter, "parts" represents "parts by weight".

[Materials Used]

The humidity-conditioning particles, thermoplastic resin powder, base sheet, other materials used in the examples and comparative examples below are as follows.

<Humidity-conditioning Particles, Water-absorbing Particles>

TABLE 1

| Humidity-conditioning particles | Average particle diameter (μm) | Modal pore diameter (nm) |
|---|---|---|
| Silica | 200 | 8.8 |
|  | 5 | 8.3 |
|  | 200 | 4.7 |
| Crystalline silica | 200 | 3.6 |
| A-type silica | 200 | 2.5 |
| B-type silica | 200 | 7.0 |
| Spherical silica | 200 | 6.0 |
| Sepiolite | 200 | 1.1 |
| Zeolite | 200 | 1.0 |
| Alumina | 180 | 7.1 |
| Water-absorbing polymer | 50 | — |

<Thermoplastic Resin Powder>

TABLE 2

| Resin | Coefficient of water absorption (%) | Water contact angle (°) | MFR (g/10 min) | Melting point (° C.) | Average particle diameter (μm) |
|---|---|---|---|---|---|
| Polyamide powder | 1.66 | 64 | 50 | 115 | 51 |
| Polyester powder | 0.30 | 93 | 45 | 125 | 27 |
| Polyurethane powder | 1.34 | 75 | 12 | 115 | 34 |
| Polyethylene powder (low-density polyethylene) | 0.09 | 93 | 24 | 105 | 21 |
| EVA powder (ethylene-vinyl acetate copolymer) | 0.09 | 91 | 70 | 97 | 20 |
|  | 0.09 | 91 | 70 | 97 | 40 |
|  | 0.09 | 91 | 70 | 97 | 80 |
| Saponified EVA powder | 0.16 | 82 | 90 | 100 | 51 |

<Antibacterial Agent>

Silver zeolite: "Zeomic LB10N" manufactured by Sinanen Zeomic Co., Ltd., average particle diameter 7 μm <Base Sheet>

Polyester spun-bonded nonwoven fabric: "Eltas Ester E1040" manufactured Asahi Kasei Fibers Corporation, areal weight 40 g/m², thickness 240 μm Polyester plain-woven fabric (textile): Tropical "T5000" areal weight 100 g/m², thickness 300 μm <Binder>

Acrylic binder: "SK Dyne 1720" manufactured by Soken Chemical & Engineering Co., Ltd., solid content 46 to 48%

<Separation Sheet>

Base sheet composed of semi-bleached kraft paper and having a separating layer formed by coating silicone on one of the surface thereof, "N-80HS" manufactured by Sanei Kaken Co., Ltd.

In the examples and comparative examples below, measurement of the physical properties of silica used as the humidity-conditioning particles, evaluation of the thermoplastic resin powder, base sheet, and other materials used, and like were conducted by the methods described below excluding properties known from documents and the like.

[Measurement Method]

<Pore Volume, Specific Surface Area, Modal Pore Diameter>

A BET nitrogen adsorption isotherm was measured by means of AS-1 manufactured by Quanthachrome Co. to obtain a pore volume (ml/g), a specific surface area (m²/g), and a modal pore diameter $D_{max}$ (nm). Specifically, a measured value at a relative pressure $P/P_0=0.98$ was adopted for the pore volume, and the specific surface area was calculated from the amount of nitrogen adsorbed at relative pressures $P/P_0=0.1$, 0.2, and 0.3 using a BET multipoint method.

Further, a pore distribution curve was obtained by a HK or SF method known by persons skilled in the art for particles with a modal pore diameter ($D_{max}$) of 5 nm or less and by a BJH method for a modal pore diameter ($D_{max}$) of 5 nm or more. The interval between the relative pressures of the respective measurement points was determined to be 0.025.

<Powder X-ray diffractometry>

Powder X-ray diffractometry measurement was performed using an RAD-RB apparatus manufactured by Rigaku Industrial Co. and CuKα as a radiation source. As conditions for measurement, a divergent slit, a scattering slit, and a receiving slit were determined to be 1/2 deg, 1/2 deg, and 0.15 mm, respectively.

<Average Particle Diameter>

The average particle diameter of the silica was determined from the results of measurement of a particle size distribution using a laser diffraction/scattering type particle size distribution measurement apparatus (for example, Laser Micronsizer LMS-24 manufactured by Seishin Enterprise Co., Ltd.) or the like.

<Silanol Amount>

The silanol amount of silica was calculated from a change in weight measured by the thermogravimetry as described above.

<Coefficient of Water Absorption of Thermoplastic Resin>

The coefficient of water absorption of the thermoplastic resin was calculated from a change in weight measured by the water absorption treatment described above.

<MFR of Thermoplastic Resin>

MFR of the thermoplastic resin was measured according to the JISK 6760 described above.

<Void Ratio of Humidity-conditioning Layer>

The void ratio of the humidity-conditioning layer was determined from the volume of a constituent material in the humidity-conditioning layer, which was determined from the specific gravity and the weight of the material used for constituting the humidity-conditioning layer, and the apparent volume of the humidity-conditioning layer.

[Evaluation Method]

<Forming Method>

The humidity-conditioning sheet was cut into a 10-cm square with a cutter and evaluated by confirming the following conditions:

⊙: The base sheet, the humidity-conditioning particles, and other constituent materials were firmly bonded and fixed with the thermoplastic resin powder by heat sealing. In the cut humidity-conditioning sheet, the base sheet was not separated from the humidity-conditioning layer, and falling of the particles was not visually observed when the sheet was cut into a 10-cm square.

○: The materials were firmly bonded and fixed with the thermoplastic resin powder. In the cut humidity-conditioning sheet, the base sheet was not separated from the humidity-conditioning layer, and when the sheet was cut into a 10-cm square, an amount of falling of the particles was less than 10 mg.

Δ: The materials were firmly bonded and fixed with the thermoplastic resin powder. In the cut humidity-conditioning sheet, the base sheet was separated from the humidity-conditioning layer, and when the sheet was cut into a 10-cm square, an amount of falling of the particles was less than 10 mg.

X: The materials were not sufficiently bonded and fixed with the thermoplastic resin powder. In the cut humidity-conditioning sheet, the base sheet was separated from the humidity-conditioning layer, and when the sheet was cut into a 10-cm square, an amount of falling of the particles was 10 mg or more.

<Moisture Adsorption>

The humidity-conditioning sheet was cut into a 10-cm square and allowed to stand for 3 hours in a thermohygrostat at a temperature of 20° C. and a relative humidity of 25% to made constant weight, and then allowed to stand for 1 hour at a temperature of 20° C. and a relative humidity of 60%. Further, the 10-cm square was allowed to stand for 1 hour at a temperature of 20° C. and a relative humidity of 95%. In this treatment, an increase in weight was measured to evaluate moisture adsorption on the basis of the following criteria:

⊙: When the relative humidity was changed from 60% to 95%, a change in amount of moisture adsorption per g of the humidity-conditioning particles was 0.6 g or more, and when the relative humidity was 95%, a total amount of moisture adsorption per g of the humidity-conditioning particles was 0.8 g or more.

○: When the relative humidity was changed from 60% to 95%, a change in amount of moisture adsorption per g of the humidity-conditioning particles was 0.6 g or less, and when the relative humidity was 95%, a total amount of moisture adsorption per g of the humidity-conditioning particles was 0.8 g or more.

Δ: When the relative humidity was changed to 95%, a total amount of moisture adsorption per g of the humidity-conditioning particles was 0.2 g to less than 0.8 g.

X: When the relative humidity was changed to 95%, a total amount of moisture adsorption per g of the humidity-conditioning particles was less than 0.2 g.

<Moisture Desorption>

The humidity-conditioning sheet was cut into a 10-cm square and allowed to stand for 3 hours in a thermohygrostat at a temperature of 20° C. and a relative humidity of 25% to made constant weight, and then allowed to stand for 2 hours at a temperature of 20° C. and a relative humidity of 95% to adsorb moisture. Then, the relative humidity was immediately returned to 25% at 20° C. to again desorb moisture. One hour and 2 hours after this time, a decrease in weight of the humidity-conditioning layer was measured to evaluate moisture desorption on the basis of the following criteria:

⊙: The amount of moisture adsorption per g of the humidity-conditioning particles was 0.2 g or more, and 90% or more of the adsorbed moisture was desorbed within 1 hour.

○: The amount of moisture adsorption per g of the humidity-conditioning particles was 0.2 g or more, 75% to less than 90% of the adsorbed moisture was desorbed within 1 hour, and 90% or more of the adsorbed moisture was desorbed within 2 hours.

Δ: The amount of moisture adsorption per g of the humidity-conditioning particles was 0.2 g or more, less than 75% of the adsorbed moisture was desorbed within 1 hour, but 75% to less than 90% of the adsorbed moisture was desorbed within 2 hours.

X: The amount of moisture adsorption per g of the humidity-conditioning particles was less than 0.2 g, or less than 75% of the adsorbed moisture was desorbed within 2 hours.

<Water Absorption>

The humidity-conditioning sheet was cut into a 10-cm square and 50 μL of water droplets were placed thereon to confirm water absorption on the basis of the following criteria for the rate of water permeation:

⊙: All droplets were absorbed in the sheet within 3 minutes.

○: All droplets were not absorbed in the sheet within 3 minutes, but water spots (permeation marks) were observed after the droplets were wiped off.

X: All droplets were not absorbed in the sheet within 3 minutes, and water spots were not observed after the droplets were wiped off.

<Antifungal Property>

The humidity-conditioning sheet was cut into a 4-cm square and fungal resistance of the humidity-conditioning sheet was evaluated according to JIS Z2911 (fungal resistant test method) and decided on the basis of the following criteria:

⊙: The occurrence of molds was not observed with the eyes and a microscope.

○: The occurrence of molds was not observed with the eyes.

X: The occurrence of molds was observed with the eyes.

Example 1

In a 5 L separable flask (with a jacket) made of glass and having an air-open water cooled condenser attached to the top thereof, 1,000 g of pure water charged. Then, 1,400 g of tetramethoxysilane was charged to the flask over 3 minutes under stirring at 80 rpm. The molar ratio of water/tetramethoxysilane was about 6/1.

In addition, hot water of 50° C. was passed through the jacket of the separable flask. Then, stirring was continued and then stopped when the content reached the boiling point. Then, hot water of 50° C. was passed through the jacket for about 0.5 hour to gelate the produced sol.

Then, the resultant gel was rapidly taken out and ground by passing through a nylon net with an opening of 600 microns to prepare powdery wet gel (silica hydrogel). Then, g of the hydrogel and 450 g of pure water were charged in a 1 L glass autoclave and subjected to hydrothermal treatment at 180° C. for 3 hours. Then, the resultant product was passed through a nylon net having an opening of 100 microns to remove a liquid, and the filter cake was dried under reduced pressure at 160° C. until it become constant weight without water washing.

The resultant silica gel (silica according to the present invention) was ground by a Comil grinder and classified with a net to prepare silica powder (silica gel) having an average particle diameter of 200 μm. As a result of observation of each of the particles of the resultant silica powder with a scanning electron microscope, all particles were ground particles having broken surfaces.

As a result of measurement of the physical properties of the resultant silica by the above-described methods, the specific surface area was 390 m$^2$/g, the pore volume was 1.00 ml/g, the modal pore diameter ($D_{max}$) was 8.8 nm, the average particle diameter was 200 μm, and the silanol amount was 3.9 groups/nm$^2$.

In a powdery X-ray diffractometry, no crystalline peak was observed, and no peak was observed due to a periodic structure on the lower angle side (2θ≦5 deg).

The resultant silica was uniformly mixed with the thermoplastic resin powder (polyester powder; coefficient of water absorption, 0.30%; water contact angle 93°; MFR 45 g/10 min, melting point 125° C., average particle diameter 27 μm) at a weight ratio (resin weight/silica weight) of 1/2, and 1 part of silver zeolite as an antibacterial agent was further added relative to a total of 100 parts of the resultant mixture and uniformly mixed. The resultant mixed powder was uniformly scattered in an amount of 400 g/m² on a polyester spun-bonded nonwoven fabric "Eltas Ester E1040" used as the base sheet. Further, a spun-bonded nonwoven fabric was laminated thereon to sandwich the mixed powder between two base sheets.

Next, the resulting laminate was treated by a hot press at 0.5 MPa for 2 minutes at a temperature 10° C. higher than the melting point of the thermoplastic resin powder to thermocompression-bonding them, producing a humidity-conditioning sheet.

The evaluation results of the resulting humidity-conditioning sheet are shown in Table 3.

The thickness and void ratio of the humidity-conditioning layer formed are also shown in Table 3.

The thickness and void ratio of the humidity-conditioning layer were determined as follows:

A humidity-conditioning sheet was produced by the same method as in Examples and Comparative Examples except that a polyester separation film or aluminum foil was used as a base sheet. Then, the separation film or aluminum foil was removed, and the thickness of only the humidity-conditioning layer was measured at 8 points for each sheet using a micrometer. An average was regarded as the thickness.

A sample of 12 cm×12 cm was cut from the sheet, and the void ratio was calculated by the above-described method for calculating the void ratio using a silica absolute specific gravity of 2 and a meso-porous silica pore volume of 1.089 cm³/g.

Example 2

A humidity-conditioning sheet was produced under the same conditions as in Example 1 except that the same silica and thermoplastic resin powder as in Example 1 were uniformly mixed at a weight ratio (resin weight/silica weight) of 1/1.

The evaluation results of the resulting humidity-conditioning sheet are shown in Table 3.

The thickness and void ratio of the humidity-conditioning layer formed are also shown in Table 3.

Example 3

A humidity-conditioning sheet was produced under the same conditions as in Example 1 except that the same silica as in Example 1 was uniformly mixed with thermoplastic resin powder (polyurethane powder; coefficient of water absorption, 1.34%; water contact angle 75°; MFR 12 g/10 min, melting point 115° C., average particle diameter 34 μm) at a weight ratio (resin weight/silica weight) of 1/2.

The evaluation results of the resulting humidity-conditioning sheet are shown in Table 3.

The thickness and void ratio of the humidity-conditioning layer formed are also shown in Table 3.

Example 4

A humidity-conditioning sheet was produced under the same conditions as in Example 1 except that the same silica as in Example 1 and the same thermoplastic resin powder as in Example 3 were uniformly mixed at a weight ratio (resin weight/silica weight) of 1/1.

The evaluation results of the resulting humidity-conditioning sheet are shown in Table 3.

The thickness and void ratio of the humidity-conditioning layer formed are also shown in Table 3.

Example 5

A humidity-conditioning sheet was produced under the same conditions as in Example 1 except that the same silica as in Example 1 was uniformly mixed with thermoplastic resin powder (polyamide powder; coefficient of water absorption, 1.66%; water contact angle 64°; MFR 50 g/10 min, melting point 115° C., average particle diameter 51 μm) at a weight ratio (resin weight/silica weight) of 1/4.

The evaluation results of the resulting humidity-conditioning sheet are shown in Table 3.

The thickness and void ratio of the humidity-conditioning layer formed are also shown in Table 3.

Example 6

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 1/2.

The evaluation results of the resulting humidity-conditioning sheet are shown in Table 3.

The thickness and void ratio of the humidity-conditioning layer formed are also shown in Table 3.

Example 7

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 1/1.

The evaluation results of the resulting humidity-conditioning sheet are shown in Table 3.

The thickness and void ratio of the humidity-conditioning layer formed are also shown in Table 3.

Example 8

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 2/1.

The evaluation results of the resulting humidity-conditioning sheet are shown in Table 3.

The thickness and void ratio of the humidity-conditioning layer formed are also shown in Table 3.

Example 9

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 4/1.

The evaluation results of the resulting humidity-conditioning sheet are shown in Table 3.

The thickness and void ratio of the humidity-conditioning layer formed are also shown in Table 3.

Example 10

A humidity-conditioning sheet was produced under the same conditions as in Example 1 except that the same silica as in Example 1 was uniformly mixed with thermoplastic resin powder (polyethylene powder (low-density polyethylene); coefficient of water absorption, 0.09%; water contact angle 93°; MFR 24 g/10 min, melting point 105° C., average particle diameter 21 μm) at a weight ratio (resin weight/silica weight) of 1/2.

The evaluation results of the resulting humidity-conditioning sheet are shown in Table 3.

The thickness and void ratio of the humidity-conditioning layer formed are also shown in Table 3.

Example 11

A humidity-conditioning sheet was produced under the same conditions as in Example 1 except that the same silica as in Example 1 was uniformly mixed with thermoplastic resin powder (EVA powder; coefficient of water absorption, 0.09%; water contact angle 910; MFR 70 g/10 min, melting point 97° C., average particle diameter 40 μm) at a weight ratio (resin weight/silica weight) of 1/2.

The evaluation results of the resulting humidity-conditioning sheet are shown in Table 3.

The thickness and void ratio of the humidity-conditioning layer formed are also shown in Table 3.

Example 12

A humidity-conditioning sheet was produced under the same conditions as in Example 1 except that the same silica as in Example 1 was uniformly mixed with thermoplastic resin powder (saponified EVA powder; coefficient of water absorption, 0.16%; water contact angle 820; MFR 90 g/10 min, melting point 100° C., average particle diameter 51 μm) at a weight ratio (resin weight/silica weight) of 1/2.

The evaluation results of the resulting humidity-conditioning sheet are shown in Table 3.

The thickness and void ratio of the humidity-conditioning layer formed are also shown in Table 3.

Comparative Example 1

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 1/8.

The evaluation results of the resulting humidity-conditioning sheet are shown in Table 3.

The thickness and void ratio of the humidity-conditioning layer formed are also shown in Table 3.

Comparative Example 2

A humidity-conditioning sheet was produced under the same conditions as in Example 1 except that the same silica as in Example 1 and the same thermoplastic resin powder as in Example 5 were uniformly mixed at a weight ratio (resin weight/silica weight) of 5/1.

The evaluation results of the resulting humidity-conditioning sheet are shown in Table 3.

The thickness and void ratio of the humidity-conditioning layer formed are also shown in Table 3.

Comparative Example 3

A humidity-conditioning sheet was produced under the same conditions as in Example 1 except that the same silica as in Example 1 and the same thermoplastic resin powder as in Example 11 were uniformly mixed at a weight ratio (resin weight/silica weight) of 1/5.

The evaluation results of the resulting humidity-conditioning sheet are shown in Table 3.

The thickness and void ratio of the humidity-conditioning layer formed are also shown in Table 3.

Comparative Example 4

A humidity-conditioning sheet was produced under the same conditions as in Example 1 except that the same silica as in Example 1 and the same thermoplastic resin powder as in Example 11 were uniformly mixed at a weight ratio (resin weight/silica weight) of 5/1.

The evaluation results of the resulting humidity-conditioning sheet are shown in Table 3.

The thickness and void ratio of the humidity-conditioning layer formed are also shown in Table 3.

TABLE 3

| | Resin | Resin/silica (particle diameter ratio) | Resin/silica (weight ratio) | Thickness (mm) | Void ratio (%) | Formability | Moisture adsorption | Moisture desorption | Water absorption | Antifungal properties |
|---|---|---|---|---|---|---|---|---|---|---|
| Example 1 | Polyester | 0.14 | 0.50 | 0.81 | 34 | ○ | ⊚ | ⊚ | ⊚ | ○ |
| Example 2 | | | 1.00 | 0.63 | 24 | ○ | ⊚ | ⊚ | ⊚ | ○ |
| Example 3 | Polyurethane | 0.20 | 0.50 | 0.91 | 40 | ○ | ⊚ | ⊚ | ⊚ | ○ |
| Example 4 | | | 1.00 | 0.71 | 29 | ○ | ⊚ | ⊚ | ⊚ | ○ |
| Example 5 | Polyamide | 0.26 | 0.25 | 0.90 | 37 | Δ | ⊚ | ⊚ | ⊚ | ○ |
| Example 6 | | | 0.50 | 0.89 | 39 | ○ | ⊚ | ⊚ | ⊚ | ○ |
| Example 7 | | | 1.00 | 0.88 | 41 | ○ | ⊚ | ⊚ | ⊚ | ○ |
| Example 8 | | | 2.00 | 0.57 | 38 | ○ | Δ | ⊚ | ○ | ○ |
| Example 9 | | | 4.00 | 0.49 | 5 | ⊚ | Δ | ⊚ | ○ | ○ |
| Example 10 | Polyethylene | 0.12 | 0.50 | 1.00 | 43 | ○ | ⊚ | ⊚ | ⊚ | ○ |
| Example 11 | EVA | 0.20 | 0.50 | 0.98 | 42 | ○ | ⊚ | ⊚ | ⊚ | ○ |
| Example 12 | Saponified EVA | 0.26 | 0.50 | 0.94 | 40 | ○ | ⊚ | ⊚ | ⊚ | ○ |
| Comparative Example 1 | Polyamide | 0.26 | 0.13 | 0.89 | — | X | — | — | — | — |
| Comparative Example 2 | | | 5.00 | 0.42 | 2 | ⊚ | X | X | X | ○ |

TABLE 3-continued

|  | Resin | Resin/silica (particle diameter ratio) | Resin/silica (weight ratio) | Thickness (mm) | Void ratio (%) | Formability | Moisture adsorption | Moisture desorption | Water absorption | Antifungal properties |
|---|---|---|---|---|---|---|---|---|---|---|
| Comparative Example 3 | EVA | 0.20 | 0.20 | 0.92 | — | X | — | — | — | — |
| Comparative Example 4 | | | 5.00 | 0.46 | 1 | ◎ | X | X | X | ○ |

Table 3 indicates that when the humidity-conditioning particles are heat-fused with the thermoplastic resin powder, as the weight ratio of the thermoplastic resin powder to the silica decreased, the formability (adhesion between the base sheet and the humidity-conditioning layer) is more difficult to achieve. However, in this case, the pores of silica and the voids between the particles are not closed with the resin to increase the water retention spaces, thereby improving moisture adsorption/desorption and water absorption. On the other hand, as the weight ratio of the thermoplastic resin powder to the silica increases, the formability becomes more excellent. However, in this case, the pores of silica and the voids between the particles are closed with the molten resin to decrease moisture adsorption/desorption and water absorption. Therefore, in order to achieve the humidity-conditioning sheet with sufficient formability, it is necessary to form the humidity-conditioning layer having a void ratio of 5% or more.

Example 13

A humidity-conditioning sheet was produced under the same conditions as in Example 1 except that the same silica as in Example 1 was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

Example 14

A humidity-conditioning sheet was produced under the same conditions as in Example 1 except that the same silica as in Example 1 was uniformly mixed with thermoplastic resin powder (EVA powder; coefficient of water absorption, 0.09%; water contact angle 91°; MFR 70 g/10 min, melting point 97° C., average particle diameter 80 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

Example 15

The silica gel (silica according to the present invention) obtained by drying under reduced pressure in Example 1 was ground with a grinder (Hosokawa Micron AFG-200 model) and further classified by air pressure to prepare silica powder having an average particle diameter of 5 μm. As a result of observation of each of the particles of the resultant silica powder with a scanning electron microscope, all particles were ground particles having broken surfaces.

As a result of measurement of the physical properties of the resultant silica by the above-described methods, the specific surface area was 487 m$^2$/g, the pore volume was 1.06 ml/g, the modal pore diameter ($D_{max}$) was 8.3 nm, the average particle diameter was 5 μm, and the silanol amount was 3.9 groups/nm$^2$.

In a powdery X-ray diffraction pattern, no crystalline peak was observed, and no peak was observed due to a periodic structure on the lower angle side ($2\theta \leq 5$ deg).

A humidity-conditioning sheet was produced under the same conditions as in Example 1 except that the resultant silica was uniformly mixed with thermoplastic resin powder (EVA powder; coefficient of water absorption, 0.09%; water contact angle 91°; MFR 70 g/10 min, melting point 97° C., average particle diameter 20 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

Example 16

A humidity-conditioning sheet was produced under the same conditions as in Example 1 except that the same silica as in Example 15 was uniformly mixed with the thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

Comparative Example 5

A humidity-conditioning sheet was produced under the same conditions as in Example 1 except that the same silica as in Example 13 was uniformly mixed with thermoplastic resin powder (EVA powder; coefficient of water absorption, 0.09%; water contact angle 91°; MFR 70 g/10 min, melting point 97° C., average particle diameter 20 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

Comparative Example 6

A humidity-conditioning sheet was produced under the same conditions as in Example 1 except that the same silica as in Example 15 was uniformly mixed with thermoplastic resin powder (EVA powder; coefficient of water absorption, 0.09%; MFR 70 g/10 min, melting point 97° C., average particle diameter 80 μm) at a weight ratio (resin weight/silica weight) of 1/1.

The evaluation results of the resulting humidity-conditioning sheet are shown in Table 4.

The thickness and void ratio of the humidity-conditioning layer formed are also shown in Table 4.

TABLE 4

| | Resin | Resin/silica (particle diameter ratio) | Resin/silica (weight ratio) | Thickness (mm) | Void ratio (%) | Formability | Moisture adsorption | Moisture desorption | Water absorption | Antifungal properties |
|---|---|---|---|---|---|---|---|---|---|---|
| Example 13 | EVA | 0.20 | 1.00 | 0.88 | 41 | ○ | ◎ | ◎ | ◎ | ○ |
| Example 14 | | 0.40 | | 0.55 | 6 | ○ | ◎ | ◎ | ◎ | ○ |
| Example 15 | | 4.00 | | 0.62 | 15 | ○ | ◎ | ◎ | ◎ | ○ |
| Example 16 | | 8.00 | | 0.78 | 32 | Δ | ◎ | ◎ | ◎ | ○ |
| Comparative Example 5 | EVA | 0.10 | 1.00 | 0.78 | — | X | — | — | — | — |
| Comparative Example 6 | | 16.00 | | 0.82 | — | X | — | — | — | — |

Table 4 indicates that in heat-sealing the humidity-conditioning particles with the thermoplastic resin powder, when there is a large difference between the particle diameter of the silica and that of the thermoplastic resin powder, the voids between the particles are filled with the particles with a small diameter, and thus a uniform humidity-conditioning layer cannot be formed, thereby failing to achieve sufficient formability. Further, the voids between the particles are closed with the molten resin to decrease moisture adsorption/desorption and water absorption. On the other hand, the silica and the thermoplastic resin powder can be more uniformly scattered as the difference in particle diameter decreases. Therefore, sufficient formability (adhesion between the base sheet and the humidity-conditioning layer) can be obtained while maintaining the voids between the particles without closing the silica pores. In addition, such a humidity-conditioning sheet is excellent in formability, moisture adsorbing/desorbing properties, water absorbing properties, and antifungal properties.

Example 17

A humidity-conditioning sheet was produced under the same conditions as in Example 1 except that silica (the specific surface area was 660 m$^2$/g, the pore volume was 0.78 ml/g, the modal pore diameter ($D_{max}$) was 4.7 nm, the average particle diameter was 200 µm, and the silanol amount was 5 groups/nm$^2$) prepared under the same conditions as in Example 1 except that hydrothermal treatment was performed at 130° C. was uniformly mixed with thermoplastic resin powder (EVA powder; coefficient of water absorption, 0.09%; water contact angle 91°; MFR 70 g/10 min, melting point 97° C., average particle diameter 40 µm) at a weight ratio (resin weight/silica weight) of 1/1.

The evaluation results of the resulting humidity-conditioning sheet are shown in Table 5.

Example 18

A gel mixture containing silica, a 20 wt % tetramethylammonium hydroxide (TEAOH) aqueous solution and cetyltrimethylammonium bromide (CTMABr) at a weight ratio of 0.2:0.25:35 in water was prepared. Specifically, first, 62 g of CTMABr was added to 404 g of water, and the resultant mixture was mixed and stirred at room temperature. Then, 100 g of an aqueous TEAOH solution was added under stirring, and finally 41 g of fumed silica was added to prepare a gel mixture.

The resultant gel mixture was further stirred at 70° C. for 2 hours and aged at room temperature for 24 hours. Next, the gel mixture was heated at 150° C. for 48 hours using an autoclave to perform synthesis. After cooling, the product was filtered and washed, naturally dried, and then fired at 600° C. for 6 hours to obtain crystalline silica (MCM-41).

A humidity-conditioning sheet was produced under the same conditions as in Example 1 except that the resultant silica (the specific surface area was 985 m$^2$/g, the pore volume was 0.78 ml/g, the modal pore diameter ($D_{max}$) was 3.60 nm, and the average particle diameter was 200 µm) was uniformly mixed with thermoplastic resin powder (EVA powder; coefficient of water absorption, 0.09%; water contact angle 91°; MFR 70 g/10 min, melting point 97° C., average particle diameter 40 µm) at a weight ratio (resin weight/silica weight) of 1/1.

The evaluation results of the resulting humidity-conditioning sheet are shown in Table 5.

Example 19

A humidity-conditioning sheet was produced under the same conditions as in Example 1 except that A-type silica (the specific surface area was 650 m$^2$/g, the pore volume was 0.36 ml/g, the modal pore diameter ($D_{max}$) was 2.5 nm, and the average particle diameter was 200 µm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 µm) at a weight ratio (resin weight/silica weight) of 1/1.

The evaluation results of the resulting humidity-conditioning sheet are shown in Table 5.

Example 20

A humidity-conditioning sheet was produced under the same conditions as in Example 1 except that B-type silica (the specific surface area was 450 m$^2$/g, the pore volume was 0.80 ml/g, the modal pore diameter ($D_{max}$) was 7.0 nm, and the average particle diameter was 200 µm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 µm) at a weight ratio (resin weight/silica weight) of 1/1.

The evaluation results of the resulting humidity-conditioning sheet are shown in Table 5.

Example 21

A humidity-conditioning sheet was produced under the same conditions as in Example 1 except that sepiolite (the specific surface area was 320 m$^2$/g, the pore volume was 0.70 ml/g, the modal pore diameter ($D_{max}$) was 1.1 nm, and the average particle diameter was 200 µm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 5.

Example 22

A humidity-conditioning sheet was produced under the same conditions as in Example 1 except that zeolite (the specific surface area was 400 m²/g, the pore volume was 0.50 ml/g, the modal pore diameter ($D_{max}$) was 1.0 nm, and the average particle diameter was 200 μm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 5.

Comparative Example 7

A humidity-conditioning sheet was produced under the same conditions as in Example 1 except that alumina (the specific surface area was 160 m²/g, the pore volume was 0.40 ml/g, the modal pore diameter ($D_{max}$) was 7.1 nm, and the average particle diameter was 180 μm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 5.

Comparative Example 8

A humidity-conditioning sheet was produced under the same conditions as in Example 1 except that water-absorbing polymer (average particle diameter 50 μm) as humidity-conditioning particles was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 5.

Also, the results of Example 13 are shown in Table 5.

Table 5 indicates that when a silicon compound is contained as the humidity-conditioning particles, moisture adsorption and desorption properties within a short time are excellent. The moisture adsorption and desorption can be easily effected on the higher-humidity side as the pore diameter increases, while the moisture adsorption and desorption can be easily effected on the lower-humidity side as the pore diameter decreases. By using such properties, moisture can be appropriately controlled using a humidity-conditioning sheet including humidity-conditioning particles having different pore diameters according to circumferential environment. When a silicon compound is contained, the surface of the humidity-conditioning particles are hydrophilic, thereby producing a humidity-conditioning sheet excellent in the water absorption property. Although a water-absorbing polymer exhibit excellent water absorption property, the humidity-conditioning sheet is undesirably broken due to cubical expansion by water absorption.

Example 24

A humidity-conditioning sheet was produced under the same conditions as in Example 1 except that the silica (ground silica) used in Example 17 (the specific surface area was 660 m²/g, the pore volume was 0.78 ml/g, and the modal pore diameter ($D_{max}$) was 4.7 nm, the average particle diameter was 200 μm, and the silanol amount was 5 groups/nm²) and spherical silica (the specific surface area was 450 m²/g, the pore volume was 0.60 ml/g, and the modal pore diameter ($D_{max}$) was 6.0 nm, and the average particle diameter was 200 μm) were uniformly mixed at a weight ratio of 1:1 and further uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

The evaluation results of the resulting humidity-conditioning sheet are shown in Table 6.

The thickness and void ratio of the humidity-conditioning layer are also shown in Table 6.

Comparative Example 9

A humidity-conditioning sheet was produced under the same conditions as in Example 1 except that the same spherical silica as in Example 24 (the specific surface area was 450 m²/g, the pore volume was 0.60 ml/g, and the modal pore diameter ($D_{max}$) was 6.0 nm, and the average particle diameter was 200 μm) was uniformly mixed with thermoplastic resin powder (EVA powder; coefficient of water absorption, 0.09%; water contact angle 91°; MFR 70 g/10 min, melting point 97° C., average particle diameter 40 μm) at a weight ratio (resin weight/silica weight) of 1/1.

TABLE 5

| | | Humidity-conditioning particles | | | | | | |
|---|---|---|---|---|---|---|---|---|
| | Resin | Type | Average particle diameter (μm) | Modal pore diameter (nm) | Formability | Moisture adsorption | Moisture desorption | Water absorption | Antifungal properties |
| Example 13 | EVA | Silica | 200 | 8.8 | ○ | ⊚ | ⊚ | ⊚ | ○ |
| Example 17 | | Silica | 200 | 4.7 | ○ | ○ | ⊚ | ⊚ | ○ |
| Example 18 | | Crystalline silica | 200 | 3.6 | ○ | ○ | ⊚ | ○ | ○ |
| Example 19 | | A-type silica | 200 | 2.5 | ○ | Δ | ○ | ⊚ | ○ |
| Example 20 | | B-type silica | 200 | 7.0 | ○ | ⊚ | ⊚ | ⊚ | ○ |
| Example 21 | | Sepiolite | 200 | 1.1 | ○ | Δ | X | ○ | ○ |
| Example 22 | | Zeolite | 200 | 1.0 | ○ | Δ | X | ○ | ○ |
| Comparative Example 7 | EVA | Alumina | 180 | 7.1 | ○ | Δ | X | X | ○ |
| Comparative Example 8 | | Water-absorbing polymer | 50 | — | ○ | Δ | X | ⊚ | ○ |

The evaluation results of the resulting humidity-conditioning sheet are shown in Table 6.

The thickness and void ratio of the humidity-conditioning layer are also shown in Table 6.

The results of Example 17 are also shown in Table 6.

used as a separation sheet and then sufficiently dried to a single-side adhesive sheet. Further, the adhesive layer side was bonded to one of the surfaces of the humidity-conditioning sheet prepared in Example 13 to prepare a single-side adhesive humidity-conditioning sheet. The evaluation results

TABLE 6

|  | Resin | Humidity-conditioning particles | Thickness (mm) | Void ratio (%) | Formability | Moisture adsorption | Moisture desorption | Water absorption | Antifungal properties |
|---|---|---|---|---|---|---|---|---|---|
| Example 17 | EVA | Ground silica | 0.86 | 40 | ○ | ◎ | ◎ | ◎ | ○ |
| Example 18 | EVA | Spherical silica + ground silica | 0.96 | 20 | ○ | ◎ | ◎ | ◎ | ○ |
| Comparative Example 9 | EVA | Spherical silica | 0.83 | 1 | ○ | ○ | ○ | X | ○ |

Table 6 indicates that when spherical silica is used as the humidity-conditioning particles, the void ratio is decreased due to closest packing of the silica. When a mixture of spherical silica and ground silica is used, a sufficient void ratio can be maintained because closest packing is not caused as in the case of ground silica. Since the water retention in the voids increases as the void ratio increases, the water absorption property is excellent, and thus the higher effect of preventing dew condensation can be exhibited.

Example 25

A humidity-conditioning sheet was produced under the same conditions as in Example 13 except that 5 parts of silver zeolite as an antibacterial agent was added and uniformly mixed relative to a total of 100 parts of the silica and thermoplastic resin powder used in Example 13. The evaluation results of the resulting humidity-conditioning sheet are shown in Table 7.

Example 26

A humidity-conditioning sheet was produced under the same conditions as in Example 13 except that textile (polyester plain-woven fabric: Tropical "T5000", areal weight 100 g/m², thickness 300 μm) was used as a base sheet. The evaluation results of the resulting humidity-conditioning sheet are shown in Table 7.

Example 27

An acrylic adhesive was uniformly applied in an amount of 70 g/m² on the silicone coat side of semi-bleached kraft paper of the resulting humidity-conditioning sheet are shown in Table 7.

The results of Example 13 are also shown in Table 7.

TABLE 7

|  | Resin | Humidity-conditioning particles | Other function added | Formability | Moisture adsorption | Moisture desorption | Water absorption | Antifungal properties |
|---|---|---|---|---|---|---|---|---|
| Example 13 | EVA | Silica | Addition of 1 part of antibacterial agent | ○ | ◎ | ◎ | ◎ | ○ |
| Example 25 |  |  | Addition of 5 parts of antibacterial agent | ○ | ◎ | ◎ | ◎ | ◎ |
| Example 26 |  |  | Single-side textile | ○ | ◎ | ◎ | ◎ | ○ |
| Example 27 |  |  | Single-side adhesive treatment | ○ | ○ | ○ | ◎ | ○ |

Table 7 indicates that the antifungal property is improved by adding a larger amount of an antibacterial agent to the humidity-conditioning layer. Even when textile is used as a base sheet, the same degree of performance can be achieved, and a humidity-conditioning sheet particularly excellent in the water absorption property can be obtained. The workability is improved by one-side adhesive treatment.

Examples 28 to 31 and Comparative Examples 10 to 13

A humidity-conditioning sheet of the present invention was prepared using a powder lamination apparatus shown in FIG. 3 or 4. A polyester spun-bonded nonwoven fabric was used as each of the upper sheet 37 and the lower sheet 32. The same humidity-conditioning particles and thermoplastic resin powder as used in Example 7, and silver zeolite as an antibacterial agent were mixed at a weight ratio of 50/50/1 and the resultant mixture was charged in the mixed powder feed hopper 34. The line speed of the upper sheet 37 and the lower sheet 32 was 2 m/min, and the mixed powder was uniformly d at a rate of 400 g/min on the lower sheet 32 from the mixed powder feed hopper 34. Further, the upper sheet 37 was laminated on the lower sheet 32 to sandwich the mixed powder between the two base sheet. Then, the resulting laminate was treated under the thermocompression bonding conditions shown in Table 8 to prepare a humidity-conditioning sheet. The evaluation results of the humidity-conditioning sheet are shown in Table 8.

TABLE 8

|  | Powder lamination apparatus | Temperature of upper heating roller or upper heating belt (° C.) | Temperature of lower silicone rubber roller or lower heating belt (° C.) | Pressing pressure (MPa) | Formability | Moisture adsorption | Moisture desorption | Water absorption | Antifungal properties |
|---|---|---|---|---|---|---|---|---|---|
| Example 28 | Heating roller type | 160 | 100 | 4 | ◯ | ◎ | ◎ | ◎ | ◯ |
| Example 29 | Heating roller type | 165 | 120 | 4 | ◯ | ◯ | ◯ | ◯ | ◯ |
| Example 30 | Heating belt type | 140 | 140 | 0.05 | ◯ | ◎ | ◎ | ◎ | ◯ |
| Example 31 | Heating belt type | 155 | 155 | 0.05 | ◯ | ◎ | ◎ | ◎ | ◯ |
| Comparative Example 10 | Heating roller type | 140 | 90 | 4 | X | — | — | — | — |
| Comparative Example 11 | Heating roller type | 180 | 120 | 4 | ◯ | X | X | X | ◯ |
| Comparative Example 12 | Heating belt type | 130 | 130 | 0.05 | X | — | — | — | — |
| Comparative Example 13 | Heating belt type | 180 | 180 | 0.05 | ◯ | X | X | X | ◯ |

The humidity-conditioning sheet of the present invention is, for example, useful for the following applications:

(1) The humidity-conditioning sheet is attached to walls and ceiling surfaces of buildings and storages to prevent deterioration of building materials, furniture, and stored articles due to dew condensation.

(2) The humidity-conditioning sheet is attached to ceiling surfaces and the like of refrigerators (freezer) and refrigerator cars (freezer cars) to prevent deterioration of stored articles due to dew condensation.

(3) The humidity-conditioning sheet is attached to the inner walls of casings for containing electric/electronic components such as electric lights and precision electronic apparatuses to prevent clouding of lenses and short-circuiting of electric circuits due to dew condensation.

(4) The humidity-conditioning sheet is attached to the inner walls of storage cases for music instruments, pictures, dolls, and the like to maintain suitable humidity in storage atmospheres by controlling humidity in the cases.

Although the present invention is described in detail with reference to the specified embodiments, it is obvious to persons skilled in the art that various modifications can be made within the scope of the gist of the present invention.

This application is based on Japanese Patent Application (Patent Application No. 2006-344535) filed on Dec. 21, 2006, the entirety of which is incorporated by reference herein.

The invention claimed is:

1. A humidity-conditioning sheet comprising a sheet-shaped humidity-conditioning layer,
    wherein the layer is formed by bonding humidity-conditioning particles containing a silicon compound with thermoplastic resin powder, said humidity-conditioning particles reversibly adsorbing and desorbing moisture,
    wherein the humidity-controlling sheet is a laminated humidity-controlling sheet prepared by laminating a base material sheet composed of an air-permeable material on at least one of the surfaces of the humidity-conditioning layer so that the base material sheet is integrated with the humidity-conditioning layer,
    wherein the humidity-conditioning particles have an average particle diameter of 5 to 1,000 μm, wherein a weight ratio of the thermoplastic resin powder to the humidity-conditioning particles which constitute the humidity-conditioning layer is 1/4 to 4/1, and
    wherein the humidity-conditioning layer has a void ratio of 5% or more.

2. The humidity-conditioning sheet according to claim 1, wherein a ratio of an average particle diameter of the thermoplastic resin powder to that of the humidity-conditioning particles is 1/8 to 15/1.

3. The humidity-conditioning sheet according to claim 1, wherein the humidity-conditioning layer includes an antibacterial agent and/or an antifungal agent.

4. The humidity-conditioning sheet according to claim 1, wherein the thermoplastic resin has a water absorption coefficient of 0.2% or more and a MFR (Melt Flow Rate) of 55 g/10 min or less.

5. A humidity-conditioning sheet comprising a sheet-shaped humidity-conditioning layer,
    wherein the layer is formed by bonding humidity-conditioning particles containing a silicon compound with thermoplastic resin powder, said humidity-conditioning particles reversibly adsorbing and desorbing moisture,
    wherein the humidity-conditioning sheet is a laminated humidity-conditioning sheet prepared by laminating a base material sheet on at least one of the surfaces of the humidity-conditioning layer, providing an adhesive layer on the side of the base material sheet opposite to the humidity-conditioning layer, and further laminating a separation sheet on the adhesive layer,
    wherein the humidity-conditioning particles have an average particle diameter of 5 to 1,000 μm, wherein a weight ratio of the thermoplastic resin powder to the humidity-conditioning particles which constitute the humidity-conditioning layer is 1/4 to 4/1, and
    wherein the humidity-conditioning layer has a void ratio of 5% or more.

6. The humidity-conditioning sheet according to claim 5, wherein a ratio of an average particle diameter of the thermoplastic resin powder to that of the humidity-conditioning particles is 1/8 to 15/1.

7. The humidity-conditioning sheet according to claim 5, wherein the humidity-conditioning layer includes an antibacterial agent and/or an antifungal agent.

8. The humidity-conditioning sheet according to claim 5, wherein the thermoplastic resin has a water absorption coefficient of 0.2% or more and a MFR (Melt Flow Rate) of 55 g/10 min or less.

9. The humidity-conditioning sheet according to claim 1, wherein the humidity-conditioning sheet is a laminated humidity-conditioning sheet prepared by laminating a first base material sheet composed of an air-permeable material on one of the surfaces of the humidity-conditioning layer and laminating a second base material sheet on the other of the surfaces of the humidity-conditioning layer so that the base material sheets are integrated with the humidity-conditioning layer.

10. The humidity-conditioning sheet according to claim 1, wherein the humidity-conditioning sheet is a laminated humidity-conditioning sheet prepared by scattering the humidity-conditioning particles and the thermoplastic resin powder on a first base material sheet, laminating a second base material sheet on the surface of the first base material sheet on which the particles and the resin powder are scattered to form a laminate, and heating or pressing the laminate under heating to bond together the humidity-conditioning particles with the thermoplastic resin powder and bond the base sheet to the humidity-conditioning layer.

* * * * *